(12) United States Patent
Ording et al.

(10) Patent No.: US 12,182,377 B2
(45) Date of Patent: Dec. 31, 2024

(54) UPDATING DISPLAY OF WORKSPACES IN A USER INTERFACE FOR MANAGING WORKSPACES IN RESPONSE TO USER INPUT

(71) Applicant: Apple Inc., Cupertino, CA (US)

(72) Inventors: Bas Ording, San Francisco, CA (US); John Louch, Boulder, CO (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/451,314

(22) Filed: Oct. 18, 2021

(65) Prior Publication Data

US 2022/0137758 A1 May 5, 2022

Related U.S. Application Data

(63) Continuation of application No. 15/348,968, filed on Nov. 10, 2016, now Pat. No. 11,150,780, which is a
(Continued)

(51) Int. Cl.
*G06F 3/0482* (2013.01)
*G06F 3/04817* (2022.01)
(Continued)

(52) U.S. Cl.
CPC ........ *G06F 3/0482* (2013.01); *G06F 3/04817* (2013.01); *G06F 3/04883* (2013.01); *G06F 9/451* (2018.02); *G06F 2203/04802* (2013.01)

(58) Field of Classification Search
CPC .... G06F 3/0482; G06F 9/451; G06F 3/04817; G06F 3/04883; G06F 2203/04802
See application file for complete search history.

(56) References Cited

U.S. PATENT DOCUMENTS

| | | | |
|---|---|---|---|
| 4,555,755 A | 11/1985 | Kurosawa et al. | |
| 4,555,775 A | 11/1985 | Pike | |

(Continued)

FOREIGN PATENT DOCUMENTS

| | | | |
|---|---|---|---|
| CN | 1818845 A | 8/2006 | |
| CN | 101071370 A | 11/2007 | |

(Continued)

OTHER PUBLICATIONS

"3D Desktop Project by Sun MicroSystems: a Revolutionary Evolution of Today's Desktop", Available online at: <http://www.lg3d.dev.java.net>, Accessed on Nov. 9, 2006, 1 page.
"3DNA Desktop", Available online at: <http://www.3dna.net/products/desktop.html>, Accessed on Nov. 9, 2006, 2 pages.
Advisory Action received for U.S. Appl. No. 12/907,982, mailed on Oct. 2, 2013, 4 pages.
(Continued)

*Primary Examiner* — Beau D Spratt
(74) *Attorney, Agent, or Firm* — Kubota & Basol LLP

(57) ABSTRACT

Providing a bridge interface for managing virtual workspaces is disclosed. A plurality of workspace images is presented in a user interface, each workspace image corresponding to a different virtual workspace available to a user of a computer system. A user can generate new virtual workspaces using an appropriate user input, such as by selecting a user interface object for generating new virtual workspaces. In some implementations, a new thumbnail image representing the new virtual workspace can be automatically created after the user opts for creation of the new workspace.

27 Claims, 15 Drawing Sheets

Related U.S. Application Data continuation of application No. 12/907,982, filed on Oct. 19, 2010, now Pat. No. 9,542,202.

(51) Int. Cl.
*G06F 3/04883* (2022.01)
*G06F 9/451* (2018.01)

(56) References Cited

U.S. PATENT DOCUMENTS

| | | | |
|---|---|---|---|
| 4,890,098 A | 12/1989 | Dawes et al. | |
| 5,072,412 A | 12/1991 | Henderson et al. | |
| 5,191,620 A | 3/1993 | Lee | |
| 5,233,687 A | 8/1993 | Henderson et al. | |
| 5,265,202 A | 11/1993 | Krueger et al. | |
| 5,333,272 A | 7/1994 | Capek et al. | |
| 5,363,475 A | 11/1994 | Baker et al. | |
| 5,425,141 A | 6/1995 | Gedye | |
| 5,461,710 A | 10/1995 | Bloomfield et al. | |
| 5,463,728 A | 10/1995 | Blahut et al. | |
| 5,483,261 A | 1/1996 | Yasutake | |
| 5,487,143 A | 1/1996 | Southgate | |
| 5,488,204 A | 1/1996 | Mead et al. | |
| 5,499,334 A | 3/1996 | Staab | |
| 5,513,303 A | 4/1996 | Robertson et al. | |
| 5,533,183 A | 7/1996 | Henderson et al. | |
| 5,565,657 A | 10/1996 | Merz | |
| 5,577,188 A | 11/1996 | Zhu | |
| 5,588,105 A | 12/1996 | Foster et al. | |
| 5,590,265 A | 12/1996 | Nakazawa | |
| 5,594,467 A | 1/1997 | Marlton et al. | |
| 5,638,501 A | 6/1997 | Gough et al. | |
| 5,651,107 A | 7/1997 | Frank et al. | |
| 5,657,221 A | 8/1997 | Warman et al. | |
| 5,678,015 A | 10/1997 | Goh | |
| 5,694,150 A | 12/1997 | Sigona et al. | |
| 5,737,507 A | 4/1998 | Smith | |
| 5,754,174 A | 5/1998 | Carpenter et al. | |
| 5,764,229 A | 6/1998 | Bennett | |
| 5,767,855 A | 6/1998 | Bardon et al. | |
| 5,798,752 A | 8/1998 | Buxton et al. | |
| 5,822,123 A | 10/1998 | Davis et al. | |
| 5,825,352 A | 10/1998 | Bisset et al. | |
| 5,831,615 A | 11/1998 | Drews et al. | |
| 5,835,079 A | 11/1998 | Shieh | |
| 5,838,318 A | 11/1998 | Porter et al. | |
| 5,841,435 A | 11/1998 | Dauerer et al. | |
| 5,859,639 A | 1/1999 | Ebrahim | |
| 5,880,411 A | 3/1999 | Gillespie et al. | |
| 5,880,733 A | 3/1999 | Horvitz et al. | |
| 5,892,511 A | 4/1999 | Gelsinger et al. | |
| 5,903,271 A | 5/1999 | Bardon et al. | |
| 5,905,992 A | 5/1999 | Lucas et al. | |
| 5,920,313 A | 7/1999 | Diedrichsen et al. | |
| 5,920,315 A | 7/1999 | Santos-Gomez | |
| 5,923,324 A | 7/1999 | Berry et al. | |
| 5,929,854 A | 7/1999 | Ross | |
| 5,936,610 A | 8/1999 | Endo | |
| 5,940,517 A | 8/1999 | Shinada et al. | |
| 5,973,665 A | 10/1999 | Davie et al. | |
| 5,986,639 A | 11/1999 | Ozawa et al. | |
| 5,999,191 A | 12/1999 | Frank et al. | |
| 6,008,809 A | 12/1999 | Brooks | |
| 6,016,145 A | 1/2000 | Horvitz et al. | |
| 6,031,529 A | 2/2000 | Migos et al. | |
| 6,057,835 A | 5/2000 | Sato et al. | |
| 6,061,064 A | 5/2000 | Reichlen | |
| 6,072,489 A | 6/2000 | Gough et al. | |
| 6,081,271 A | 6/2000 | Bardon et al. | |
| 6,088,018 A | 7/2000 | Deleeuw et al. | |
| 6,094,196 A | 7/2000 | Berry et al. | |
| 6,118,427 A | 9/2000 | Buxton et al. | |
| 6,147,684 A | 11/2000 | Nielsen et al. | |
| 6,151,030 A | 11/2000 | Deleeuw et al. | |
| 6,163,318 A | 12/2000 | Fukuda et al. | |
| 6,188,391 B1 | 2/2001 | Seely et al. | |
| 6,222,538 B1 | 4/2001 | Anderson | |
| 6,222,554 B1 | 4/2001 | Berry et al. | |
| 6,246,407 B1 | 6/2001 | Wilks et al. | |
| 6,249,826 B1 | 6/2001 | Parry et al. | |
| 6,252,595 B1 | 6/2001 | Birmingham et al. | |
| 6,292,204 B1 | 9/2001 | Carleton et al. | |
| 6,307,545 B1 | 10/2001 | Conrad et al. | |
| 6,310,610 B1 | 10/2001 | Beaton et al. | |
| 6,323,846 B1 | 11/2001 | Westerman et al. | |
| 6,336,131 B1 | 1/2002 | Wolfe | |
| 6,342,908 B1 | 1/2002 | Bates et al. | |
| 6,353,450 B1 | 3/2002 | Deleeuw | |
| 6,359,631 B2 | 3/2002 | Deleeuw | |
| 6,374,277 B2 | 4/2002 | Vong et al. | |
| 6,409,603 B1 | 6/2002 | Nishino et al. | |
| 6,414,677 B1 | 7/2002 | Robertson et al. | |
| 6,429,883 B1 | 8/2002 | Plow et al. | |
| 6,433,798 B1 | 8/2002 | Smith et al. | |
| 6,509,911 B1 | 1/2003 | Shimotono | |
| 6,515,688 B1 | 2/2003 | Berry et al. | |
| 6,549,218 B1 | 4/2003 | Gershony et al. | |
| 6,570,557 B1 | 5/2003 | Westerman et al. | |
| 6,577,350 B1 | 6/2003 | Proehl et al. | |
| 6,587,128 B2 | 7/2003 | Kanevsky et al. | |
| 6,600,500 B1 | 7/2003 | Yamamoto | |
| 6,654,036 B1 | 11/2003 | Jones | |
| 6,661,426 B1 | 12/2003 | Jetha et al. | |
| 6,670,970 B1 | 12/2003 | Bonura et al. | |
| 6,677,932 B1 | 1/2004 | Westerman | |
| 6,678,866 B1 | 1/2004 | Sugimoto et al. | |
| 6,690,387 B2 | 2/2004 | Zimmerman et al. | |
| 6,694,486 B2 | 2/2004 | Frank et al. | |
| 6,720,982 B1 | 4/2004 | Sakaguchi | |
| 6,734,884 B1 | 5/2004 | Berry et al. | |
| 6,765,567 B1 | 7/2004 | Roberson et al. | |
| 6,828,989 B2 | 12/2004 | Cortright | |
| 6,874,126 B1 | 3/2005 | Lapidous | |
| 6,876,369 B2 | 4/2005 | Brown et al. | |
| 6,907,447 B1 | 6/2005 | Cooperman et al. | |
| 6,996,783 B2 | 2/2006 | Brown et al. | |
| 7,015,894 B2 | 3/2006 | Morohoshi | |
| 7,043,701 B2 | 5/2006 | Gordon | |
| 7,046,254 B2 | 5/2006 | Brown et al. | |
| 7,068,266 B1 | 6/2006 | Ruelle | |
| 7,119,819 B1 | 10/2006 | Robertson et al. | |
| 7,138,983 B2 | 11/2006 | Wakai et al. | |
| 7,155,729 B1 | 12/2006 | Andrew et al. | |
| 7,184,064 B2 | 2/2007 | Zimmerman et al. | |
| 7,249,326 B2 | 7/2007 | Stoakley et al. | |
| 7,249,327 B2 | 7/2007 | Nelson et al. | |
| 7,260,610 B2 | 8/2007 | Grooters et al. | |
| 7,286,141 B2 | 10/2007 | Rieffel et al. | |
| 7,287,063 B2 | 10/2007 | Baldwin et al. | |
| 7,305,441 B2 | 12/2007 | Mathewson et al. | |
| 7,342,594 B1 | 3/2008 | Ort et al. | |
| 7,350,154 B2 * | 3/2008 | Anderson | G06F 3/0481 715/779 |
| 7,370,281 B2 | 5/2008 | Weber | |
| 7,386,801 B1 | 6/2008 | Horvitz et al. | |
| 7,406,500 B2 | 7/2008 | Bantz et al. | |
| 7,417,650 B1 | 8/2008 | Horvitz | |
| 7,451,406 B2 | 11/2008 | Yoon | |
| 7,512,902 B2 | 3/2009 | Robertson et al. | |
| 7,581,192 B2 | 8/2009 | Stabb et al. | |
| 7,594,185 B2 | 9/2009 | Anderson et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,665,033 B2 | 2/2010 | Byrne et al. | |
| RE41,922 E | 11/2010 | Gough et al. | |
| 7,844,914 B2 | 11/2010 | Andre et al. | |
| 7,904,828 B2 | 3/2011 | Conrad et al. | |
| 7,957,762 B2 | 6/2011 | Herz et al. | |
| 8,006,002 B2 | 8/2011 | Kalayjian et al. | |
| 8,214,768 B2 | 7/2012 | Boule et al. | |
| 8,239,784 B2 | 8/2012 | Hotelling et al. | |

(56) References Cited

U.S. PATENT DOCUMENTS

| | | | |
|---|---|---|---|
| 8,279,180 | B2 | 10/2012 | Hotelling et al. |
| 8,356,258 | B2 | 1/2013 | Matthews et al. |
| 8,381,135 | B2 | 2/2013 | Hotelling et al. |
| RE44,241 | E | 5/2013 | Gough et al. |
| 8,473,859 | B2 | 6/2013 | Chaudhri et al. |
| 8,479,122 | B2 | 7/2013 | Hotelling et al. |
| 8,516,391 | B2 | 8/2013 | Danton et al. |
| 8,707,197 | B2* | 4/2014 | Toyama ............... G06F 3/0481 715/778 |
| 8,839,142 | B2 | 9/2014 | Chaudhri et al. |
| 9,035,949 | B1* | 5/2015 | Oberheu ............... G06T 11/206 345/440 |
| 9,292,196 | B2 | 3/2016 | Ording et al. |
| 9,348,458 | B2 | 5/2016 | Hotelling et al. |
| 9,542,202 | B2 | 1/2017 | Ording et al. |
| 9,658,732 | B2 | 5/2017 | Ording et al. |
| 9,933,937 | B2 | 4/2018 | Lemay et al. |
| 10,152,192 | B2 | 12/2018 | Ording et al. |
| 2001/0004746 | A1 | 6/2001 | Wright |
| 2001/0028368 | A1 | 10/2001 | Swartz et al. |
| 2001/0040584 | A1 | 11/2001 | Deleeuw |
| 2002/0015024 | A1 | 2/2002 | Westerman et al. |
| 2002/0042819 | A1 | 4/2002 | Reichert et al. |
| 2002/0047859 | A1 | 4/2002 | Szlam et al. |
| 2002/0094868 | A1 | 7/2002 | Tuck et al. |
| 2002/0140746 | A1 | 10/2002 | Gargi |
| 2002/0143630 | A1 | 10/2002 | Steinman et al. |
| 2002/0167546 | A1 | 11/2002 | Kimbell et al. |
| 2002/0191028 | A1 | 12/2002 | Senechalle et al. |
| 2003/0001899 | A1 | 1/2003 | Partanen et al. |
| 2003/0016253 | A1 | 1/2003 | Aoki et al. |
| 2003/0043197 | A1 | 3/2003 | Kremer et al. |
| 2003/0051228 | A1 | 3/2003 | Martinez et al. |
| 2003/0117440 | A1 | 6/2003 | Hellyar et al. |
| 2003/0145060 | A1 | 7/2003 | Martin |
| 2003/0179234 | A1 | 9/2003 | Nelson et al. |
| 2003/0179237 | A1 | 9/2003 | Nelson et al. |
| 2003/0189597 | A1 | 10/2003 | Anderson et al. |
| 2003/0229722 | A1 | 12/2003 | Beyda |
| 2004/0001101 | A1 | 1/2004 | Trajkovic et al. |
| 2004/0066414 | A1 | 4/2004 | Czerwinski et al. |
| 2004/0098462 | A1 | 5/2004 | Horvitz et al. |
| 2004/0165010 | A1 | 8/2004 | Robertson et al. |
| 2004/0204886 | A1 | 10/2004 | Rieger et al. |
| 2005/0010876 | A1 | 1/2005 | Robertson et al. |
| 2005/0066292 | A1 | 3/2005 | Harrington |
| 2005/0125739 | A1* | 6/2005 | Thompson ............. G06F 3/0481 715/779 |
| 2005/0188329 | A1 | 8/2005 | Cutler et al. |
| 2005/0190059 | A1 | 9/2005 | Wehrenberg |
| 2005/0216918 | A1 | 9/2005 | Kuraishi |
| 2005/0223334 | A1 | 10/2005 | Guido et al. |
| 2005/0235210 | A1 | 10/2005 | Peskin et al. |
| 2005/0240880 | A1 | 10/2005 | Banks et al. |
| 2005/0257159 | A1 | 11/2005 | Keohane et al. |
| 2005/0273466 | E | 12/2005 | Yoon |
| 2005/0283742 | A1 | 12/2005 | Gusmorino et al. |
| 2006/0017692 | A1 | 1/2006 | Wehrenberg et al. |
| 2006/0026521 | A1 | 2/2006 | Hotelling et al. |
| 2006/0033724 | A1 | 2/2006 | Chaudhri et al. |
| 2006/0161861 | A1 | 7/2006 | Holecek et al. |
| 2006/0197753 | A1 | 9/2006 | Hotelling |
| 2006/0224991 | A1 | 10/2006 | Stabb et al. |
| 2007/0061745 | A1 | 3/2007 | Anthony et al. |
| 2007/0101291 | A1 | 5/2007 | Forstall et al. |
| 2007/0174777 | A1 | 7/2007 | Finley et al. |
| 2007/0192727 | A1 | 8/2007 | Finley et al. |
| 2008/0005693 | A1 | 1/2008 | Oliver et al. |
| 2008/0034317 | A1* | 2/2008 | Fard ...................... G06T 13/80 715/781 |
| 2008/0244444 | A1 | 10/2008 | Bauman et al. |
| 2008/0307352 | A1 | 12/2008 | Chaudhri et al. |
| 2008/0307359 | A1 | 12/2008 | Louch et al. |
| 2008/0307364 | A1 | 12/2008 | Chaudhri et al. |
| 2009/0064007 | A1 | 3/2009 | Lazier et al. |
| 2009/0083655 | A1* | 3/2009 | Beharie ................. G06F 9/451 715/781 |
| 2009/0100343 | A1 | 4/2009 | Lee et al. |
| 2009/0106666 | A1 | 4/2009 | Nomura |
| 2009/0178008 | A1 | 7/2009 | Herz et al. |
| 2009/0307623 | A1 | 12/2009 | Agarawala et al. |
| 2010/0050111 | A1* | 2/2010 | Duffy ................... G06F 3/0484 715/764 |
| 2010/0138767 | A1 | 6/2010 | Wang et al. |
| 2010/0169828 | A1 | 7/2010 | Kho et al. |
| 2010/0269069 | A1 | 10/2010 | Paila et al. |
| 2010/0313124 | A1 | 12/2010 | Privault et al. |
| 2011/0029934 | A1 | 2/2011 | Locker et al. |
| 2011/0078624 | A1* | 3/2011 | Missig ................. G06F 3/0484 345/173 |
| 2011/0087989 | A1* | 4/2011 | McCann ............ G06F 3/04842 715/811 |
| 2011/0252380 | A1 | 10/2011 | Chaudhri |
| 2012/0092346 | A1 | 4/2012 | Ording et al. |
| 2012/0096392 | A1 | 4/2012 | Ording et al. |
| 2012/0096395 | A1 | 4/2012 | Ording et al. |
| 2012/0096396 | A1 | 4/2012 | Ording et al. |
| 2012/0096397 | A1 | 4/2012 | Ording et al. |
| 2012/0246596 | A1 | 9/2012 | Ording et al. |
| 2015/0046557 | A1 | 2/2015 | Rosenberg |
| 2015/0227283 | A1 | 8/2015 | Luna et al. |
| 2016/0241609 | A1 | 8/2016 | Xin et al. |
| 2017/0060360 | A1 | 3/2017 | Ording et al. |
| 2022/0035513 | A1* | 2/2022 | Kang .................... G06F 3/0481 |

FOREIGN PATENT DOCUMENTS

| | | |
|---|---|---|
| CN | 101133381 A | 2/2008 |
| CN | 101714077 A | 5/2010 |
| CN | 101739196 A | 6/2010 |
| CN | 101778166 A | 7/2010 |
| EP | 0697691 A2 | 2/1996 |
| EP | 0961200 A2 | 12/1999 |
| EP | 1022650 A2 | 7/2000 |
| EP | 1033649 A2 | 9/2000 |
| EP | 2444894 A1 | 4/2012 |
| JP | 2-244323 A | 9/1990 |
| JP | 7-191820 A | 7/1995 |
| JP | 2000-152112 A | 5/2000 |
| JP | 2000-163031 A | 6/2000 |
| JP | 2001-060134 A | 3/2001 |
| JP | 2002-342033 A | 11/2002 |
| JP | 2005-275936 A | 10/2005 |
| KR | 10-2004-0032071 A | 4/2004 |
| KR | 10-2008-0002811 A | 1/2008 |
| TW | 200939105 A | 9/2009 |
| WO | 2001/069387 A2 | 9/2001 |
| WO | 2010/144331 A2 | 12/2010 |
| WO | 2012/054620 A1 | 4/2012 |
| WO | 2012/054628 A1 | 4/2012 |
| WO | 2012/115964 A2 | 8/2012 |
| WO | 2013/169849 A2 | 11/2013 |
| WO | 2014/105276 A1 | 7/2014 |

OTHER PUBLICATIONS

"BumpTop 3D Desktop Prototype—www.bumptop.com", Available online at: <http://www.youtube.com/watch?v=M0ODskdEPnQ>, May 14, 2008, 3 pages.

Examiner's Answer to Appeal Brief received for U.S. Appl. No. 12/907,986, mailed on Sep. 22, 2017, 28 pages.

Examiner's Answer to Appeal Brief received for U.S. Appl. No. 13/399,987, mailed on Sep. 8, 2016, 34 pages.

Extended European Search Report received for European Patent Application No. 11185624.1, mailed on Jan. 30, 2012, 8 pages.

Extended European Search Report received for European Patent Application No. 11185625.8, mailed on Feb. 21, 2012, 8 pages.

Extended European Search Report received for European Patent Application No. 19163083.9, mailed on Jun. 25, 2019, 7 pages.

Extended European Search Report received for European Patent Application No. 20167799.4, mailed on Jun. 25, 2020, 9 pages.

(56) References Cited

OTHER PUBLICATIONS

Final Office Action received for U.S. Appl. No. 11/635,833, mailed on Aug. 28, 2012, 8 pages.
Final Office Action received for U.S. Appl. No. 11/635,833, mailed on Jan. 26, 2010, 11 pages.
Final Office Action received for U.S. Appl. No. 11/635,833, mailed on Jun. 8, 2010, 12 pages.
Final Office Action received for U.S. Appl. No. 11/635,833, mailed on Mar. 7, 2013, 5 pages.
Final Office Action received for U.S. Appl. No. 11/635,833, mailed on Mar. 18, 2011, 11 pages.
Final Office Action received for U.S. Appl. No. 11/760,565, mailed on Jul. 20, 2010, 17 pages.
Final Office Action received for U.S. Appl. No. 11/760,565, mailed on Nov. 10, 2011, 22 pages.
Final Office Action received for U.S. Appl. No. 12/907,981, mailed on Jun. 7, 2013, 17 pages.
Final Office Action received for U.S. Appl. No. 12/907,981, mailed on Jun. 11, 2014, 16 pages.
Final Office Action received for U.S. Appl. No. 12/907,982, mailed on Dec. 19, 2014, 21 pages.
Final Office Action received for U.S. Appl. No. 12/907,982, mailed on Jun. 18, 2013, 15 pages.
Final Office Action received for U.S. Appl. No. 12/907,982, mailed on May 5, 2016, 15 pages.
Final Office Action received for U.S. Appl. No. 12/907,983, mailed on Jul. 30, 2015, 12 pages.
Final Office Action received for U.S. Appl. No. 12/907,983, mailed on Jun. 21, 2013, 14 pages.
Final Office Action received for U.S. Appl. No. 12/907,983, mailed on May 22, 2014, 15 pages.
Final Office Action received for U.S. Appl. No. 12/907,986, mailed on Dec. 4, 2014, 12 pages.
Final Office Action received for U.S. Appl. No. 12/907,986, mailed on Jun. 6, 2016, 16 pages.
Final Office Action received for U.S. Appl. No. 12/907,986, mailed on Jun. 10, 2013, 13 pages.
Final Office Action received for U.S. Appl. No. 13/399,987, mailed on Jan. 12, 2015, 15 pages.
Final Office Action received for U.S. Appl. No. 13/399,987, mailed on Sep. 12, 2013, 11 pages.
Final Office Action received for U.S. Appl. No. 15/348,968, mailed on Mar. 13, 2020, 25 pages.
Intention to Grant received for Korean Patent Application No. 10-2013-7017298, mailed on Apr. 30, 2019, 2 pages (Official copy only).
International Search Report and Written Opinion received for PCT Patent Application No. PCT/US2011/056908, mailed on Feb. 2, 2012, 13 pages.
International Search Report and Written Opinion received for PCT Patent Application No. PCT/US2011/056918, mailed on Feb. 17, 2012, 14 pages.
International Search Report received for PCT Patent Application No. PCT/US2010/025941, mailed on Mar. 18, 2013, 6 pages.
"Java Solaris Communities Partners My Sun Sun", Available online at: <http://www.sun.com/software/looking_ glass/details.XML>, Accessed on Nov. 9, 2006, 2 pages.
"Metisse—Screenshots", Available online at: <http://insitu.Iri.fr/~chapuis/metisse/screenshots>, Accessed on Nov. 9, 2006, 3 pages.
Non-Final Office Action received for U.S. Appl. No. 11/635,833, mailed on Aug. 25, 2009, 11 pages.
Non-Final Office Action received for U.S. Appl. No. 11/635,833, mailed on Feb. 6, 2012, 7 pages.
Non-Final Office Action received for U.S. Appl. No. 11/635,833, mailed on Nov. 6, 2012, 10 pages.
Non-Final Office Action received for U.S. Appl. No. 11/635,833, mailed on Oct. 13, 2010, 10 pages.
Non-Final Office Action received for U.S. Appl. No. 11/635,847, mailed on Dec. 8, 2011, 9 pages.
Non-Final Office Action received for U.S. Appl. No. 11/760,565, mailed on Mar. 3, 2010, 13 pages.
Non-Final Office Action received for U.S. Appl. No. 11/760,565, mailed on May 13, 2011, 19 pages.
Non-Final Office Action received for U.S. Appl. No. 12/907,981, mailed on Nov. 6, 2013, 15 pages.
Non-Final Office Action received for U.S. Appl. No. 12/907,981, mailed on Oct. 9, 2012, 24 pages.
Non-Final Office Action received for U.S. Appl. No. 12/907,982, mailed on Aug. 14, 2015, 18 pages.
Non-Final Office Action received for U.S. Appl. No. 12/907,982, mailed on May 23, 2014, 14 pages.
Non-Final Office Action received for U.S. Appl. No. 12/907,982, mailed on Oct. 16, 2012, 22 pages.
Non-Final Office Action received for U.S. Appl. No. 12/907,983, mailed on Apr. 21, 2016, 15 pages.
Non-Final Office Action received for U.S. Appl. No. 12/907,983, mailed on Dec. 3, 2014, 10 pages.
Non-Final Office Action received for U.S. Appl. No. 12/907,983, mailed on Nov. 7, 2013, 12 pages.
Non-Final Office Action received for U.S. Appl. No. 12/907,983, mailed on Oct. 10, 2012, 19 pages.
Non-Final Office Action received for U.S. Appl. No. 12/907,986, mailed on Aug. 19, 2015, 10 pages.
Non-Final Office Action received for U.S. Appl. No. 12/907,986, mailed on Mar. 4, 2014, 11 pages.
Non-Final Office Action received for U.S. Appl. No. 12/907,986, mailed on Oct. 15, 2012, 19 pages.
Non-Final Office Action received for U.S. Appl. No. 12/907,986, mailed on Oct. 25, 2013, 10 pages.
Non-Final Office Action received for U.S. Appl. No. 13/399,987, mailed on Apr. 10, 2014, 5 pages.
Non-Final Office Action received for U.S. Appl. No. 13/399,987, mailed on Apr. 11, 2013, 9 pages.
Non-Final Office Action received for U.S. Appl. No. 13/399,987, mailed on Sep. 15, 2014, 6 pages.
Non-Final Office Action received for U.S. Appl. No. 15/348,968, mailed on Jul. 5, 2019, 15 pages.
Notice of Allowance received for U.S. Appl. No. 11/635,833, mailed on May 3, 2013, 6 pages.
Notice of Allowance received for U.S. Appl. No. 11/635,847, mailed on Jul. 24, 2013, 8 pages.
Notice of Allowance received for U.S. Appl. No. 11/760,565, mailed on Apr. 28, 2014, 6 pages.
Notice of Allowance received for U.S. Appl. No. 11/760,565, mailed on Jan. 17, 2014, 7 pages.
Notice of Allowance received for U.S. Appl. No. 11/760,565, mailed on Oct. 8, 2013, 9 pages.
Notice of Allowance received for U.S. Appl. No. 12/907,981, mailed on Jun. 19, 2015, 9 pages.
Notice of Allowance received for U.S. Appl. No. 12/907,981, mailed on Nov. 6, 2015, 8 pages.
Notice of Allowance received for U.S. Appl. No. 12/907,982, mailed on Aug. 31, 2016, 8 pages.
Notice of Allowance received for U.S. Appl. No. 12/907,983, mailed on Jan. 17, 2017, 5 pages.
Notice of Allowance received for U.S. Appl. No. 12/907,986, mailed on Sep. 5, 2019, 6 pages.
Notice of Allowance received for U.S. Appl. No. 13/399,987, mailed on Aug. 9, 2018, 5 pages.
Notice of Allowance received for U.S. Appl. No. 13/399,987, mailed on Mar. 15, 2018, 21 pages.
Notice of Allowance received for U.S. Appl. No. 15/348,968, mailed on Feb. 3, 2021, 15 pages.
Notice of Allowance received for U.S. Appl. No. 15/348,968, mailed on Jun. 24, 2021, 14 pages.
Notice of Allowance received for U.S. Appl. No. 12/907,986, mailed on Apr. 7, 2020, 6 pages.
Patent Board Decision received for U.S. Appl. No. 12/907,986, mailed on Aug. 1, 2019, 6 pages.
Patent Board Decision received for U.S. Appl. No. 13/399,987, mailed on Nov. 15, 2017, 9 pages.

(56) References Cited

OTHER PUBLICATIONS

Pre-Appeal Brief Conference Decision received for U.S. Appl. No. 13/399,987, mailed on Jun. 19, 2015, 2 pages.
Search Report received for Chinese Patent Application No. 201180057800.1, mailed on Apr. 25, 2016, 4 pages.
Search Report received for Chinese Patent Application No. 201180057800.1, mailed on Jul. 3, 2015, 4 pages.
Search Report received for Taiwanese Patent Application No. 101105475, mailed on Apr. 23, 2014, 2 pages.
Search Report received for Taiwanese Patent Application No. 103131033, mailed on Dec. 10, 2015, 2 pages.
Spatial Research, Available online at: <http://www.spatialresearch.com/spaces>, 2005, 2 pages.
"Stanford Panorama", Sun Microsystems, Inc., Available online at: <http://www.sun.com/jsp_utils/ScreenShotPopup.jsp?title=St . . . /&im=pan_2.jpg&alt=Generic%20Screen%20Shot%20Alt%20Text11/9/2006>, Accessed on Nov. 9, 2006, 1 page.
"Switch Desktops", Sun Microsystems, Inc., Available online at: <http://www.sun.com/jsp_utils/ScreenShotPopup.jsp?title=Sw . . . /&im=pan-r_3.jpg&alt-Generic%20Screen%20Shot%20Alt%20Text11/9/2006>, Accessed on Nov. 9, 2006, 1 page.
"The TaskGalery", Available online at: <http://research.microsoft.com/ui/TaskGaller>, Accessed on Nov. 9, 2006, 3 pages.
"Three-Dimensional Desktop—Google Search", Available online at: <http://www.google.com/search?sourceid=navclient&ie=U . . . LJ:2006-42,GGLJ:en&q=%22three+dimensional+desktop%22>, Accessed on Nov. 9, 2006, 3 pages.
Agarawala et al., "Keepin' it Real: Pushing the Desktop Metaphor with Physics, Piles and the Pen", Montreal, Quebec, Available online at: <http://bumptop.com/BumpTop>, 2006, 10 pages.
Anonymous, "Exposé (Mac OS X)", Available online at: <http//:en.wikipedia.org/w/index.php?title=Exposé(Mac_OS_X_&ol . . . >, Nov. 16, 2010, 4 pages.
*Apple Inc* Vs. *Samsung Electronic*, "Samsung's Patent Local Rule 3-3 And 3-4 Disclosures", Case No. 11-cv-01846-LHK, Oct. 7, 2011, 62 pages.
Apple Inc., "Expose", Available online at: <http://www/apple.com/macosx/what-is-macosx/expose.html>, Oct. 23, 2003, p. 1.
Ati Technologies Inc., "Multimedia Center 7.1 User Guide, Version 6.0", 2000, 96 pages.
Bier et al., "Toolglass and Magic Lenses: the See-Through Interface", in James Kijiya, editor, Computer Graphics (SIGGRAPH '93 Proceedings), vol. 27, Aug. 1993, pp. 73-80.
Buckner R., "Multiple Windows and Task Complexity Effects Upon Human-Computer Interface Viewability and Productivity", U.M.I., Ann Arbor, MI, 1992, 315 pages.
Faas R., "Spaces: a Look at Apple's Take on Virtual Desktops in Leopard", Available online at: <www.computerworld.com>, Nov. 21, 2006.
Henderson et al., "Rooms: the Use of Multiple Virtual Workspaces to Reduce Space Contention in a Window-Based Graphical User Interface", ACM Transactions on Graphics, vol. 5, No. 3, Jul. 1, 1986, pp. 211-243.
Kamba et al., "Using Small Screen Space More Efficiently", CHI '96 Proceedings of the SIGCHI Conference on Human Factors in Computing Systems, Apr. 13-18, 1996, pp. 383-390.
Kurtenbach et al., "The Design of a GUI Paradigm based on Tablets, Two-Hands, and Transparency", Toronto, 8 pages.
Lee et al., "A Multi-Touch Three Dimensional Touch-Sensitive Tablet", CHI'85 Proceedings, Apr. 1985, pp. 21-25.
Lieberman Henry, "Powers of Ten Thousand: Navigating in Large Information Spaces", Proceedings of the ACM Symposium on User Interface Software and Technology, Nov. 1994, pp. 15-16.
Miah T., "Vanishing Windows—a Technique for Adaptive Window Management", LUTCHI Research Centre, Loughborough University, Jan. 17, 2000, 19 pages.
Micron Electronics Inc., "TransPort LT User's Guide", Jan. 20, 2000, 170 pages.

Norman et al., "Cognitive Layouts of Windows and Multiple Screens for User Interfaces", University of Maryland, May 20, 1986, 20 pages.
Pogue D., "Documents, Programs, and Spaces", Chapter 4, Switching to the Mac: the Missing Manual, Snow Leopard Edition, First Edition, O'Reilly Media Inc., Dec. 2009, pp. 129-134.
Raggi et al., "Booting Ubuntu for the First Time", Chapter 6, Beginning Ubuntu Linux, 5th Edition, Apress, 2010, pp. 90-92.
Raphael J. R., "Android 101: a Guide to Using Your Android Phone", PC World, Available online at: <http://www.pcworld.idg.com.au/article/345700/android_101_guide_using_your_android_phone/>, May 7, 2010, 2 pages.
Robertson et al., "Data Mountain: Using Spatial Memory for Document Management", Proceedings of the 11th Annual ACM Symposium on User Interface Software and Technology (UIST '98), Nov. 1998, pp. 153-162.
Robertson et al., "The Task Gallery: a 3D Window Manager", CHI 2000, Conference Proceedings: Conference on Human Factors in Computing Systems, the Hague, Netherlands, Apr. 1-5, 2000, pp. 494-501.
Rosenzweig G., "My iPad", Safari Books Online, Available online at: <http://proquest.safaribooksonline.com/book/hardware-and-gadets/9780132378413>, Jul. 2010.
"Rotate Window, Java Technology Powers Vodaphone Mobile Games Worldwide", Sun Microsystems, Inc., Available online at: <http:www.sun/com/jsp_utils?ScreenShotPopup.jsp?title=R . . . ss/&im=md_1.jpg&alt=Generic%20Screen%20Shot%20Alt%20Text>, 1994-2006, 1 page.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Samsung, "Additional Prior Art Relevant to the Invalidity of the '891 Patent Exhibit N", U.S. Pat. No. 7,853,891, 3 pages.
Samsung, "Samsung's Invalidity Claim Chart for Bongwon Suh et al., Popout Prism: Adding Perceptual Principles to Overview+Detail Document Interfaces, Proceedings of the Sigchi Conference on Human Factors in Computing Systems, Association for Computing Machinery", Exhibit M-8, U.S. Pat. No. 7,853,891, 19 pages.
Samsung, "Samsung's Invalidity Claim Charts for ATI Multimedia Center 7.1 ("ATI")", Exhibit M-10, U.S. Pat. No. 7,853,891, 16 pages.
Samsung, "Samsung's Invalidity Claim Charts for Crusader: No Remorse and Crusader: No Regret ("Crusader") Exhibit M-11", U.S. Pat. No. 7,853,891, 17 pages.
Samsung, "Samsung's Invalidity Claim Charts for EP 1022650 Exhibit M-6", U.S. Pat. No. 7,853,891, 15 pages.
Samsung, "Samsung's Invalidity Claim Charts for Grand Theft Auto III ("GTA3") Exhibit M-12", U.S. Pat. No. 7,853,891, 23 pages.
Samsung, "Samsung's Invalidity Claim Charts for Micron Computers, Including Micron Transport Lt, Commercially Sold, Publicly Known, or Publicly Used Before Jul. 10, 2002 ("Micron Computers") Exhibit M-13", U.S. Pat. No. 7,853,891, 13 pages.
Samsung, "Samsung's Invalidity Claim Charts for Micron Transport Lt User's Guide ("Micron") Exhibit M-9", U.S. Pat. No. 7,853,891, 16 pages.
Samsung, "Samsung's Invalidity Claim Charts for Sony Computer Displays, Including Sony Trinitron, and Computers With Sony Computer Displays Commercially Sold, Publicly Known, or Publicly Used Before Jul. 10, 2002 ("SonyTrinitron") Exhibit M-14", U.S. Pat. No. 7,853,891, 19 pages.
Samsung, "Samsung's Invalidity Claim Charts for U.S. Pat. No. 6,907,447 Exhibit M-1", U.S. Pat. No. 7,853,891, 16 pages.
Samsung, "Samsung's Invalidity Claim Charts for U.S. Pat. No. 7,155,729 Exhibit M-2", U.S. Pat. No. 7,853,891, 13 pages.
Samsung, "Samsung's Invalidity Claim Charts for U.S. Pat. No. 7,249,326 Exhibit M-3", U.S. Pat. No. 7,853,891, 13 pages.
Samsung, "Samsung's Invalidity Claim Charts for U.S. Pat. No. 7,417,650 Exhibit M-4", U.S. Pat. No. 7,853,891, 12 pages.

(56) References Cited

OTHER PUBLICATIONS

Samsung, "Samsung's Invalidity Claim Charts for U.S Publication No. 2002/0143630 Exhibit M-5", U.S. Pat. No. 7,853,891, 15 pages.
Samsung, "Samsung's Invalidity Claim Charts for U.S. Patent Application No. 2003/0016253 ("Aoki")", and Cooperman '447, Andrew '729, Steakley '326, Horvitz '650, Steinman '630, Sakaguchi '650, Suh, Micron, ATI, Crusader, GTA3, Micron Computers, Sony Trinitron, Windows, U.S. Pat. No. 7,853,891, 25 pages.
Samsung, "Samsung's Invalidity Claim Charts for Windows XP and Computers With Windows XP Commercially Sold, Publicly Known, or Publicly Used Before Jul. 10, 2002 ("Windows XP") Exhibit M-15", U.S. Pat. No. 7,853,891, 13 pages.
Samsung, "Samsung's Invalidity Claim Charts for WO 01/69387 Exhibit M-7", U.S. Pat. No. 7,853,891, 13 pages.
Suh et al., "Popout Prism: Adding Perceptual Principles to Overview+ Detail Document Interfaces", CHI 2002, Minneapolis, Apr. 20-25, 2002, 8 pages.
Westerman Wayne, "Hand Tracking, Finger Identification, and Chordic Manipulation on a Multi-Touch Surface", a Dissertation Submitted to the Faculty of the University of Delaware in Partial Fulfillment of the Requirements for the Degree of Doctor of Philosophy in Electrical Engineering, 1999, 363 pages.
Zanella et al., "Avoiding Interference Through Translucent Interface Components in Single Display Groupware", University of Calgary, Calgary, 2000, 2 pages.
Zhai et al., "The Partial-Occlusion Effect: Utilizing Semitransparency in 3D Human Computer Interaction", University of Toronto, 1996, 23 pages.
Search Report received for Chinese Patent Application No. 201810177231.8, mailed on Aug. 27, 2021, 4 pages (2 page of English Translation and 2 pages of Official Copy).
Search Report received for Chinese Patent Application No. 201810177231.8, mailed on Jan. 25, 2022, 4 pages (2 page of English Translation and 2 pages of Official Copy).

\* cited by examiner

UPDATING DISPLAY OF WORKSPACES IN A USER INTERFACE FOR MANAGING WORKSPACES IN RESPONSE TO USER INPUT

CROSS-REFERENCE TO RELATED APPLICATIONS

This application is a continuation of U.S. patent application Ser. No. 15/348,968 (now U.S. Publication No. 2017-0060360) filed Nov. 10, 2016, which is a continuation of U.S. patent application Ser. No. 12/907,982 (now U.S. Pat. No. 9,542,202), filed Oct. 19, 2010, the entire disclosures of which are incorporated herein by reference for all purposes.

TECHNICAL FIELD

This disclosure relates generally to managing virtual workspaces on a computing device.

BACKGROUND

Modern graphical user interfaces allow a large number of graphical objects or items to be displayed on a display screen at the same time. Leading personal computer operating systems, such as Apple Mac OS®, provide user interfaces in which a number of windows can be displayed, overlapped, resized, moved, configured, and reformatted according to the needs of the user or application. Taskbars, menus, virtual buttons and other user interface elements provide mechanisms for accessing and activating windows even when they are hidden behind other windows.

As a result, most computers today are capable of running a great number of different programs. This can be done by the computer executing software code locally available to the computer or by connecting the computer to a remote application server, for example over the internet. Examples of application programs include mainly business-related software such as records management programs and meeting organization programs, software that is used alternatively for business or personal use, such as word processors or email applications, and software that is mainly intended for personal use such as online chat or music file management programs.

With the large number of different applications available, users are encouraged to work with a multitude of items in their computers. Some categories of items, such as files of a certain type, can be limited to use by a particular application program, while other item categories can be compatible with several programs. Depending on the user's needs, he or she can need to use several different programs in a limited period of time as part of a daily work routine or to accomplish a particular goal. As a result, users sometimes have several windows open on the computer display at the same time.

However, with numerous windows open at once, the desktop can become cluttered and difficult to overview. As a result, it can be difficult for the user to find a particular application when needed. Further, the numerous windows and running applications can be difficult to organize and manage efficiently. For example, the user may have difficulty quickly identifying application windows that are associated with each other. In some instances, the user may have multiple workspaces, each workspace with a different configuration of graphical objects such and application windows. The user may need to quickly move from one workspace to the next while also being able to dynamically make changes to a workspace as needed.

SUMMARY

In a first general aspect, a method for managing virtual workspaces is disclosed. A plurality of workspace images is presented in a user interface, each workspace image corresponding to a different virtual workspace available to a user of a computer system. A user input indicating a selection of a presented workspace image is received. The user interface is updated to display a plurality of application windows associated with the selected virtual workspace in addition to displaying the plurality of workspace images.

Implementations can include any or all of the following features. The method can further include detecting that the user has performed a predetermined gesture via a multi-touch input device and changing an active virtual workspace designation from a current virtual workspace to a different virtual workspace associated with another of the workspace images presented in the user interface. The predetermined gesture can comprise a swipe by the user on the multi-touch input device. The different virtual workspace corresponds to a workspace image that is visually adjacent to the workspace image associated with the current virtual workspace. The predetermined gesture can comprise a swipe by the user on the multi-touch input device, and a swipe in a direction from right to left can result in a change to a virtual workspace associated with a workspace image that is visually to the left of the workspace image associated with the current virtual workspace. Alternatively, the swipe in a direction from left to right can result in a change to a virtual workspace associated with a workspace image that is visually to the right of the workspace image associated with the current virtual workspace. The displayed application windows can be visually grouped into one or more clusters, each cluster corresponding to one or more application windows sharing a common characteristic.

In a second general aspect, a computer program product is tangibly embodied in a computer-readable storage medium and includes instructions that, when executed, generate on a display device a graphical user interface for presenting virtual workspaces and perform the following operations. A plurality of workspace images is presented in a user interface, each workspace image corresponding to a different virtual workspace available to a user of a computer system. A user input indicating a selection of a presented workspace image is received. The user interface is updated to display a plurality of application windows associated with the selected virtual workspace in addition to displaying the plurality of workspace images.

Implementations can include any or all of the following features. The instructions can further include detecting that the user has performed a predetermined gesture via a multi-touch input device and changing an active virtual workspace designation from a current virtual workspace to a different virtual workspace associated with another of the workspace images presented in the user interface. The predetermined gesture can comprise a swipe by the user on the multi-touch input device. The different virtual workspace corresponds to a workspace image that is visually adjacent to the workspace image associated with the current virtual workspace. The predetermined gesture can comprise a swipe by the user on the multi-touch input device, and a swipe in a direction from right to left can result in a change to a virtual workspace associated with a workspace image that is visually to the left of the workspace image associated with the current virtual workspace. Alternatively, the swipe in a direction from left to right can result in a change to a virtual workspace associated with a workspace image that is visually to the right of the workspace image associated with the current virtual workspace. The displayed application windows can be visually grouped into one or more clusters, each cluster corresponding to one or more application windows sharing a common characteristic.

The details of one or more implementations of managing items in a user interface are set forth in the accompanying drawings and the description below. Other features, aspects, and advantages will become apparent from the description, the drawings, and the claims.

BRIEF DESCRIPTION OF THE DRAWINGS

Like reference symbols in the various drawings indicate like elements.

DETAILED DESCRIPTION

Overview

Figure 1:
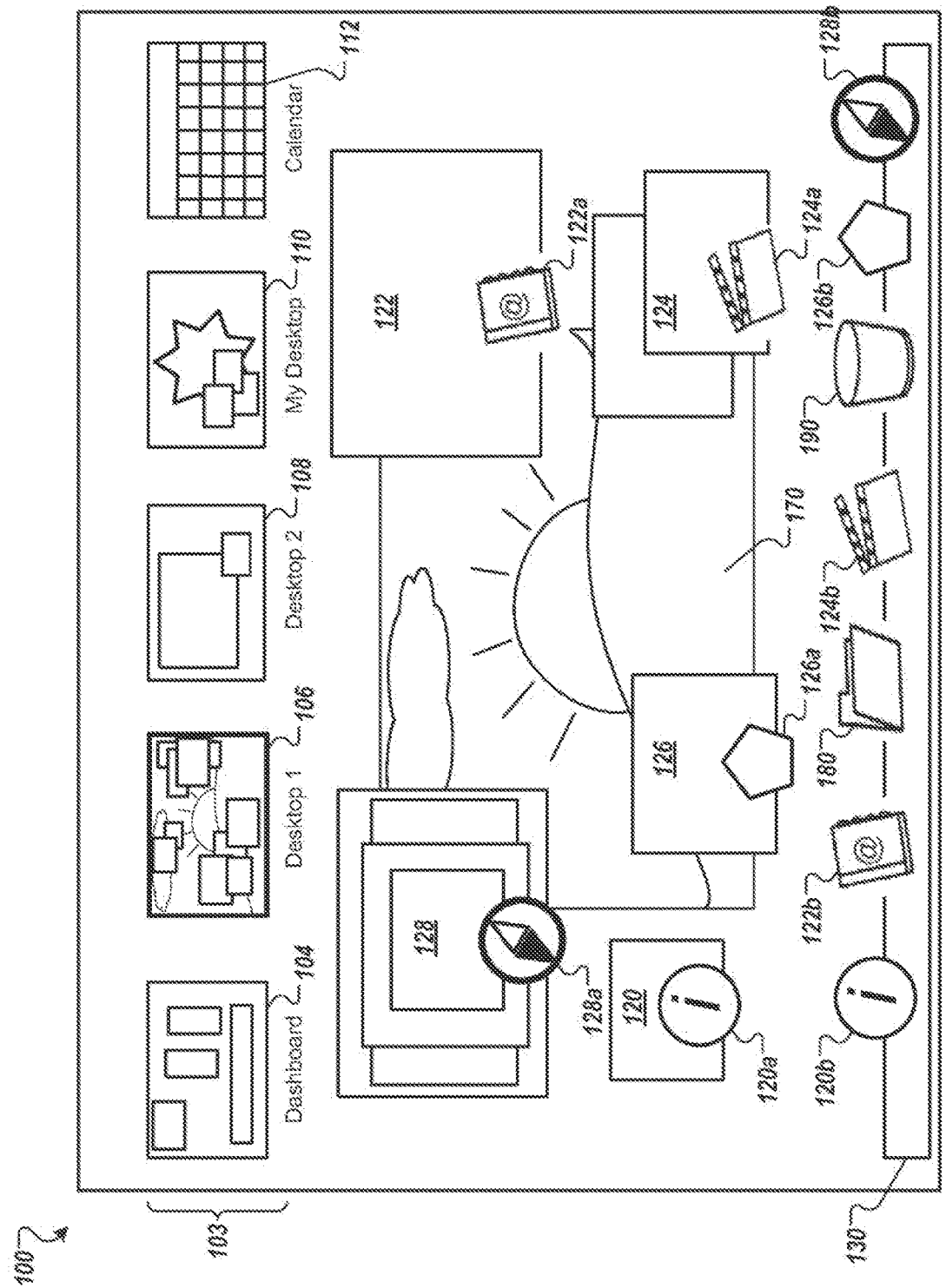
FIG. 1 illustrates an exemplary user interface showing a bridge interface for viewing and managing virtual workspaces.

Computing systems, such as personal computers, handheld devices, smart phones, gaming devices, portable computers, and so on, typically include hardware components such as a processing unit (e.g., one or more processors), memory, and various input and output devices (e.g., a display, a keyboard, a mouse, a touch-sensitive surface). An software operating system (O/S) can be installed on the computing system and executed by the processing unit to control the operations of the computing system.

Many operating systems and software applications employ graphical user interfaces (GUIs) to present information to users and to receive user input for controlling the behavior and functionality of the underlying computing devices and/or application programs. A typical two-dimensional GUI of an operating system can be described as a "desktop" metaphor.

Visually, a desktop of an operating system can provide a background (e.g., a desktop plane) on which other graphical objects, such as icons representing connected peripheral devices (e.g., disk drives, network devices, printers, etc.), installed programs, stored documents, open windows of executing application programs, file system folders, and so on, can be presented. In addition, user interface elements that allow user interaction with some aspects of the operating system can be presented at various locations on the desktop as well. For example, a three-dimensional menu bar showing basic controls of the desktop environment, a system tray showing programs executing in the background, a docking station for shortcuts to frequently used application programs, and so on, can also be presented on the desktop plane.

An operating system of a computing device can often support a large number of active applications at the same time, and each of the active applications can have multiple open windows concurrently presented on the desktop plane. The user can switch among the active applications and the open windows by selecting (e.g., clicking on) the window he/she wishes to access. Upon user selection, the selected open window can obtain input focus and becomes the current active window (or "top window") of the desktop. The user can interact with the current active window in a manner dictated by the application program providing the active window.

The windows, icons, application components, taskbars, and other graphical items currently displayed on the desktop are, in some instances, components that a user has recently used or plans to use. When the number of application windows and graphical objects displayed on a desktop increases, the user may prefer to associate certain application windows with each other. For example, a user may prefer to group together application windows that are related to the same task or application windows that have been or will be used within the same time frame.

In some implementations, the graphical objects can be grouped together into one or more virtual workspaces, or "spaces." As used herein, a space is a grouping of one or more applications, or windows, in relation to other applications or windows, such that the program(s)/application(s) of a single space is visible when the space is active, and so that a view can be generated of all spaces and their contents. Each space can depict a different desktop arrangement, including application windows, desktop images, icons, or other graphical objects that are displayed only when the associated space is active. A user can focus a view of the windows in a particular selected space such that the windows are enlarged or brought forward in the GUI with respect to windows in unselected spaces. An application program can have more than one window in a space, or an application can have windows in more than one space, to name a few examples.

A bridge interface of the GUI can present an overview of the spaces currently available to the user to allow the user to efficiently manage the different spaces. As used herein, a bridge view or bridge interface can be a display in a user interface of multiple virtual workspaces displayed concurrently with at least some of the application windows associated with one of the virtual workspaces. Thumbnail images can be displayed to represent each space, providing a miniature representation of each space as the space would look if activated. In some implementations, each thumbnail image is a live depiction of the status of application windows associated with the space represented by the thumbnail image. The user can navigate and select the thumbnails to activate a particular space using different user inputs. In the bridge interface, an activated space includes presentation of application windows associated with the space in an organized format, allowing the user to quickly identify and access application windows sharing a common characteristic.

Exemplary User Interfaces for Viewing and Managing Desktops in a User Interface

FIG. 1 illustrates an exemplary user interface, which can be a desktop of an operating system. The two-dimensional desktop plane has the appearance of being substantially co-planer or parallel to the display surface of an underlying hardware screen. When an application executing in the operating system environment generates a new window, the window can be displayed on top of the two-dimensional desktop plane. The user interface can include spaces presented in a bridge view 100 of the desktops and applications in the present example. The depiction includes elements which can be found in a display of a graphical user interface and space elements, here a dock 130 for display of available applications, groups of open application windows (120, 122, 124, 126, 128), system spaces such as a dashboard 104 or calendar 112, and several individual spaces (106, 108, 110) arranged in a row of thumbnails 103, each thumbnail representing a different space. A dashboard can be an application used for hosting mini-applications known as widgets. In some implementations, a dashboard can be a semi-transparent layer that is invisible to the user unless activated (e.g., by clicking an icon). When the dashboard is activated, the user's desktop is dimmed and widgets appear in the foreground. Widgets can provide functionality and/or information. The widgets can be moved around, rearranged, deleted and recreated. In some implementations, dashboard widgets can be HTML files that are displayed within the dashboard.

Toolbars provided by applications or the operating system can be shown on a display of a computer. In some implementations, the toolbar is hidden from view during display of the bridge view 100. The toolbar can include items such as menus, icons, and informative objects. Some menus can be general and not specific to a particular application, such as a file menu. Other menus can be application dependent, such as a terminal menu, in which case they can be added to or removed from the toolbar depending on whether a corresponding application window is active. In general, an "active application window" refers to a program window that is designated as the primary recipient of user input for input devices such as a keyboard, touchpad, or touch screen. The user, or a component such as the operating system, can cause a different program window to be designated as the active program window within a given space. Icons can be used to present information to the user, such as status information, and/or can be used to access functions via, for instance, popup menus or commands for opening another application window. The display can also include a docking element 130, which provides an area where commonly used or preferred applications can be easily accessed through selection of icons included in the docking element 130, each icon associated with a different application.

A computer display with multiple spaces is shown, including a first space 106, a second space 108, and a third space 110. In the illustrated bridge view, the spaces are arranged in a row 103 near the top of the display, with each space showing portions of a larger desktop which may be zoomed, for instance, to show more detail. In some implementations, the row of spaces 103 can be arranged in different formats and different locations on the screen. For example, the spaces in row 103 can be separated into different groups based on whether the space is a system space, such as dashboard 104, or a user-defined space. System spaces can be displayed together in row 103 while user-defined spaces can be displayed adjacent the system spaces, for example. Each of the spaces is represented in the bridge view by a condensed representation of the application windows open within that space. In the illustrated example, space 106 is represented in the row of spaces 103 by a visual workspace image 106, or thumbnail image, comprising a miniaturized depiction of the application windows opened within space 106. In zoom mode, a single space can be active and presented with a larger size, with the application windows contained in the other spaces being hidden or only partially visible. An "active" space is a selected space having its components readily available and visible for access by a user. While a particular space is active, the visual components associated with other spaces may be hidden from view. The spaces represent a desktop surface larger than what can be shown on display at once. Thus, application windows are depicted in reduced size to be able to show all or most of the active windows in the space.

In certain implementations, a space can be dedicated to a particular application or arrangement of applications. For example, as depicted in FIG. 1, a space can function as a dashboard 104 of commonly used applications, such as a weather report, clock, calculator, or other applications designated as dashboard applications. Spaces can also be dedicated for other uses, such as a calendar or planner as represented by space 112.

Each space can also be associated with a particular image such as a desktop wallpaper 170. A desktop wallpaper 170 functions as an image displayed in the background of a desktop interface. Accordingly, in addition to being associated with a group of open application windows, each space can be associated with certain display settings, such as a particular desktop image to be displayed in the background when the space is activated. In this instance, each space functions as its own desktop, and a user can personalize each space by determining the background image, the application windows used, or other settings for a particular space according to the user's preferences.

One or more application windows can be arranged in multiple ways within a space. Application windows can be positioned such that they fully or partially overlap one another. They can be resized or moved around in spaces to accommodate the user. Particularly, while many windows can be open at once and distributed among the spaces, in some implementations only the application window(s) in a particular space will be visible when that space is active. In some instances, programs or windows from another space that is not currently activated can be visible. For instance, in the bridge view 100 depicted in FIG. 1, all available spaces can be shown in an organized arrangement such as the row of spaces 103. In other instances, a small representation of another space can be visible on the display apart from the bridge view to achieve a "picture-in-picture" effect. In some cases, an application or window can briefly appear even if its space is not being displayed; for example, some events such as finishing a task can cause a program window to appear for a limited time or until a user dismisses the window.

When a space is activated, the application windows of the activated space are restored to their original positions before entering the bridge view 100. The display can exit the bridge view 100 in some implementations and present only the contents of the activated space. The background image associated with the space is displayed as the desktop wallpaper. When the bridge view 100 is displayed, the application windows for a space are grouped or clustered together in available areas of the screen. In certain instances, each grouping of windows includes all application windows or application instances associated with a particular application for a particular desktop. Further, each grouping of windows can be described as a "cluster" of application windows. The grouping of windows can also be based on other shared characteristics, such as windows that are associated with different applications but are similar in functionality. For example, several web browser windows may be open in a particular space. If the space is activated, the windows within the space are enlarged as if they are pulled into the forefront of the display. Each of the web browser windows in the space can be grouped together in a certain region of the screen, forming a cluster of web browser windows. Each cluster of windows can be associated with an icon indicating the particular application associated with the windows in a certain cluster of windows. Accordingly, a user can identify, based on the icon displayed in the region of a particular cluster of windows, the types of windows found in the cluster. Still further, a user can optionally select application windows to group together as a cluster regardless of whether the application windows share a common characteristic or are associated with the same application.

In the illustrated example, space 106 is currently selected. As seen in FIG. 1, each grouping of application windows (120, 122, 124, 126, 128) associated with space 106 is depicted in the selected desktop for space 106. Further, each grouping of application windows can include open application windows for a particular application or that share a common characteristic. For example, application windows associated with a web browser can be grouped together in one cluster 128, and an icon 128a can be displayed in the vicinity of the cluster 128 to allow a user to quickly determine that the application windows in cluster 128 are associated with a web browser application. A separate icon 128b associated with the web browser application can also be depicted in a docking element 130 for easy opening of additional windows of the web browser application. Similarly, each cluster in space 106, such as clusters 120, 122, 124, and 126, is associated with a different application. In some implementations, the clusters are displayed such that no window of any cluster overlaps with any other window of a different cluster. As depicted in FIG. 1, each of the clusters is a grouping of application windows associated with particular applications that a user can select from a docking element 130. The docking element 130 includes icons (120b, 122b, 124b, 126b, 128b, 180, 190) for each application available to a user. In some implementations, the dock 130 is displayed in the user interface regardless of the space that is currently active, allowing a user to navigate the dock 130 without losing the selected space.

Each cluster of windows can contain windows that have been reduced in size to group the windows associated with the same application together in the same region of the GUI. In certain implementations, the application windows across all clusters are reduced in size by the same scale factor to maintain the relative proportionality of the spaces. If a particular cluster has been activated, or if a specific window within the cluster is selected, the window(s) can be expanded to a larger size. If multiple windows are grouped in a cluster, they can be arranged in a particular order, such as in a cascading or overlapping arrangement. In some implementations, an ordering algorithm can be used to determine a particular order for the arrangement of windows in a cluster. For example, the ordering algorithm can use various heuristics, settings, user preferences, or other parameters to determine an order to arrange the windows in a cluster. The parameters used by the ordering algorithm can include, for example, the dimensions associated with each window, the type of window, how recent a window was accessed relative to other windows in the cluster, how recognizable a part of the window is, empirical data related to a user's preferences, and other factors used to determine an appropriate arrangement of the windows in a cluster. Further, within each cluster, the windows can be arranged such that windows with the highest priority are displayed with the most exposed areas compared to windows of lower priority. The priority of each window can depend on various factors such as how recently the window was accessed by the user, for example. For example, in a cluster of multiple application windows, a particular window that a user most recently interacted with (e.g., clicked on) may be designated as the active window in the cluster. In some implementations, windows in a cluster are grouped together in an area of the GUI and not necessarily stacked or overlapping. The clusters of windows can be grouped in a particular area based at least in part on where the windows were located in the GUI before the windows were clustered.

The bridge view shown in FIG. 1 allows the user to see the available spaces and choose which space to use. In some implementations, a user can transition into or out of the bridge view through a particular user input, such as a keyboard input, a particular gesture on a touchpad, a selection using an input device such as a mouse, or any other appropriate user input. When in the bridge view mode, applications can continue to run and program windows can be displayed in a normal fashion, for example on a smaller scale. Program windows can continue to update, for example, displaying animations, refreshing their contents, etc. The continuous updating of application windows can be shown in both the thumbnail images in row 103 and the clusters of windows in the bridge view 100. In a sense, the bridge view 100 mode provides a visual overview of all spaces and the applications and visual settings within each space to a user. Users can navigate between spaces with appropriate user input, such as by mouse, keyboard hot keys, key combinations, gestures, or other mechanisms. Other devices can also be used for input, such as those for providing alternate input capability for physically handicapped users. It can be possible for the user to zoom in on a subset of spaces. In one implementation, the system can automatically switch from one space to another based on a predefined event, such as when a specific application is launched or an application makes a particular output.

Exemplary Actions for Managing Spaces in a Bridge View

Figure 2A:
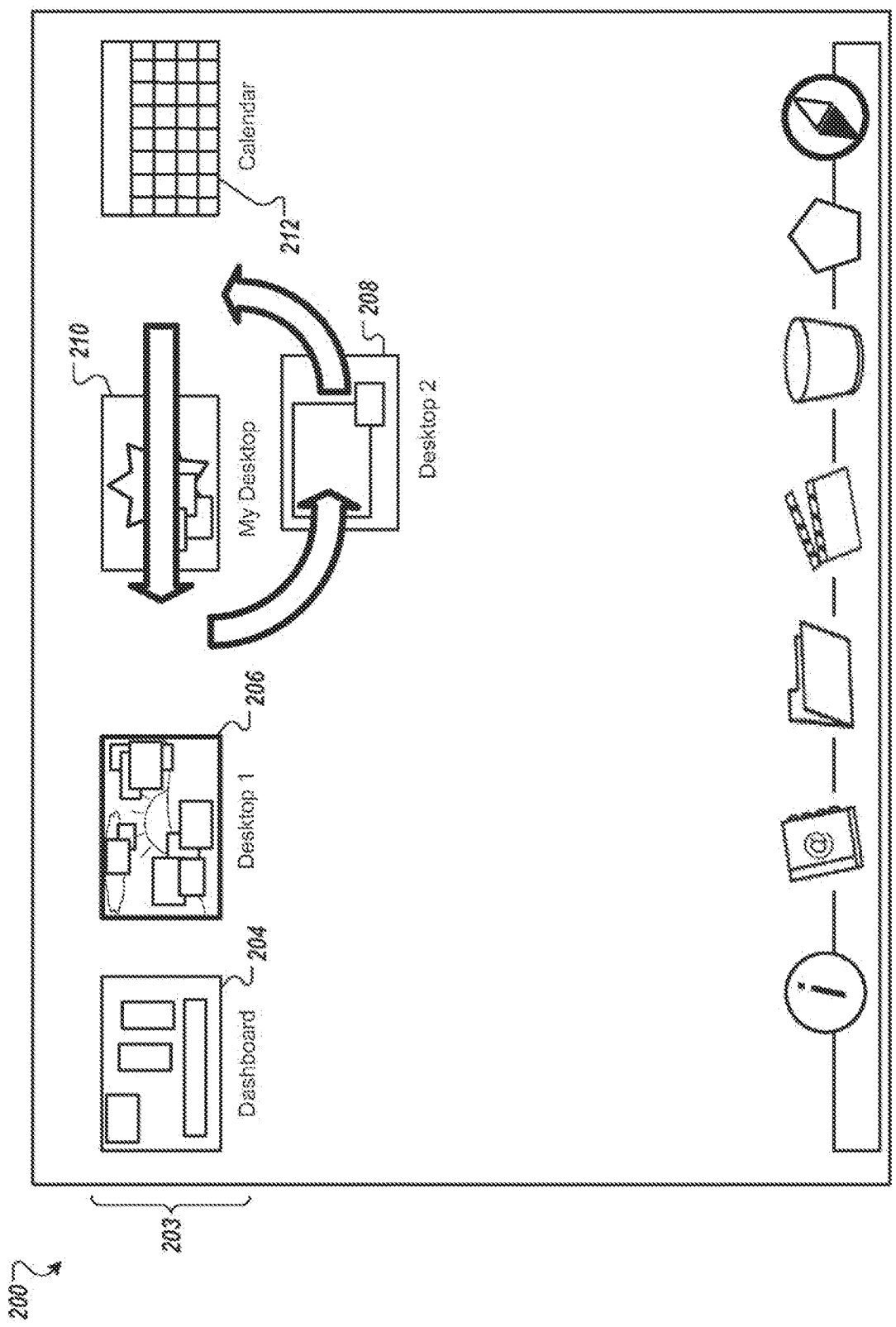
FIG. 2A illustrates an exemplary user interface showing reordering of workspace images.

FIGS. 2A-D depict example screenshots 200, 250, 280, and 290 of different actions performed on spaces in a bridge view. For example, as illustrated in FIG. 2A, the spaces in the bridge 203 can be rearranged by a user or automatically by a computer application. In the illustrated example, the spaces are initially arranged in a particular order, with a dashboard space 204 at the far left, then a first space 206, a second space 208, a third space 210, and a calendar application 212 at the far right. A user can optionally rearrange the order of the spaces using an appropriate user input. For example, the user can execute a drag and drop action using a mouse or touchpad to re-locate spaces displayed in the row of thumbnails 203. Many operating systems enable a drag and drop operation to be performed on items that are currently selected in a GUI. In the drag and drop operation, representations of the selected items can be moved (or "dragged") in the user interface from one area of a GUI to another area of the GUI following the movement of a pointer (e.g., a mouse cursor or pointing device on a touch-sensitive surface). When the items are released (or "dropped") over the drop zone of a desired target area, the selected items become the content items of the desired target area.

In the illustrated example, a user can drag and drop a space 208 from one location and insert the space into a different area, such as between different surrounding spaces. In certain implementations, however, some spaces are moveable and some are fixed. For example, a particular desktop such as space 206 can be designated as a default space and remains fixed in the row of thumbnails 203. As seen in FIG. 2A, space 208 can be extracted from an original position between spaces 206 and 210, and inserted further to the right between spaces 210 and 212. As a user navigates the row of spaces 203, a pointer or other indicator of input sliding over a particular space thumbnail can trigger an animation that temporarily enlarges the space thumbnail to allow a user to view the contents of the space in greater detail, while the surrounding spaces shrink in size to accommodate the temporary enlargement. If the space is moved to a new position already occupied by another space, the other space can be automatically relocated to make room for the moved space. Also, the relocated space or one or more other spaces can be adjusted to fill the vacated space position. In some implementations, the animation of rearranging space 208 can include a depiction of space 208 being pulled from its original location by a cursor controlled by a user, following the cursor as the cursor moves to a different area of the screen, and detaching from the cursor onto a region of the screen after the user has entered an input such as releasing a button on an input device. Here, space 208 is moved between spaces 210 and 212, and space 210 shifts to the left to assume space 208's original position in the row 203. A user can also specify a preferred way to handle space movements.

Other operations can be performed on a space such as, for example, renaming a particular space or selecting a new wallpaper for a space.

Figure 2B:
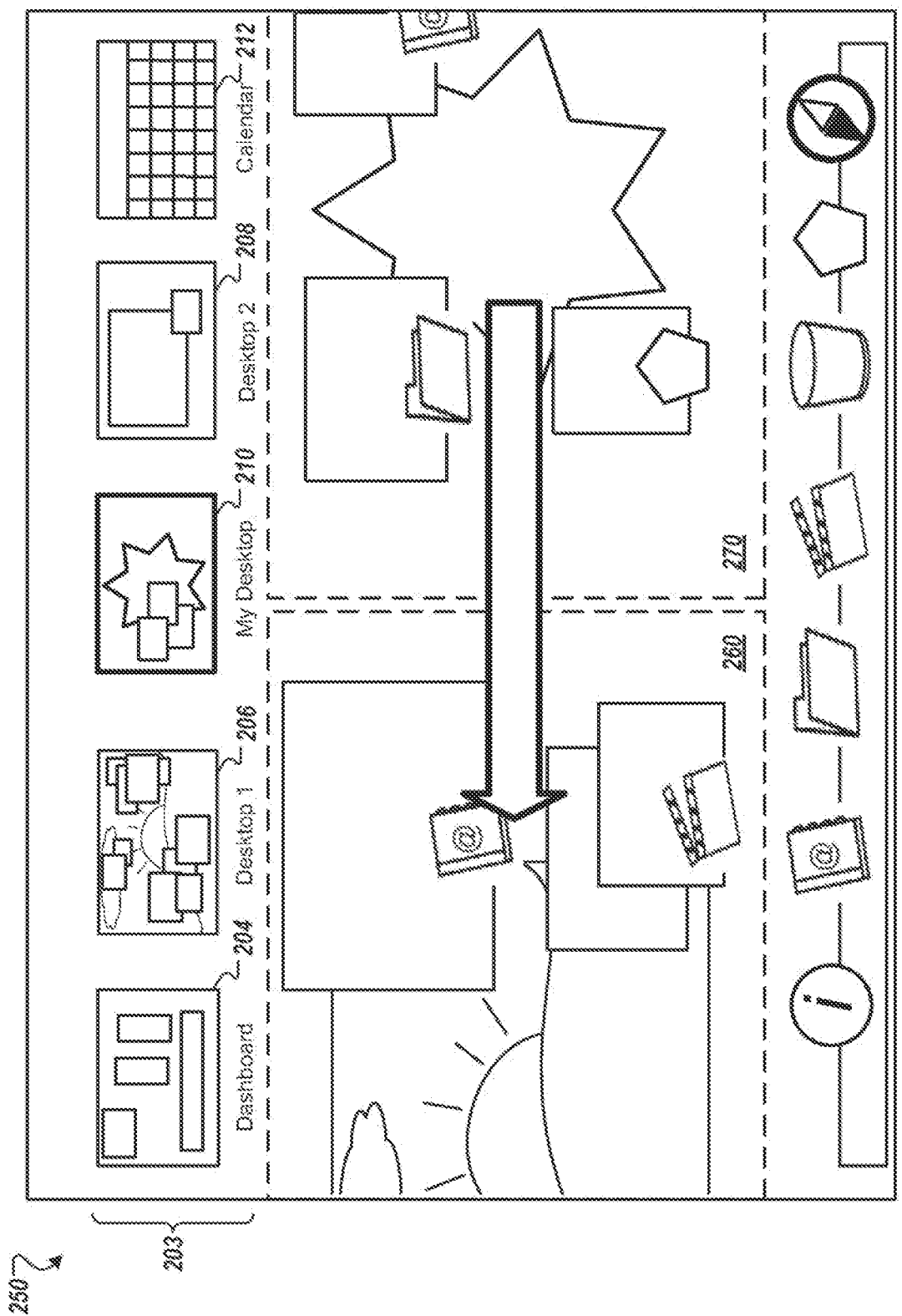
FIG. 2B illustrates an exemplary user interface showing a transition from one active workspace to a different workspace while in the bridge interface.

FIG. 2B illustrates an example screenshot of a transition from one active space to a different active space. In certain implementations, a user can activate a first space and then seamlessly transition from the first space to a newly activated second space. For example, when a user activates a space, such as space 206 in FIG. 2B, the clusters of application windows and the desktop wallpaper associated with space 206 are displayed in workspace 260. Here, the application windows and desktop wallpapers associated with spaces that are not currently activated are not displayed in the main workspace 260 of space 206 (although condensed versions of those application windows and desktop wallpapers may be seen in the thumbnail images in the row of images 203 representing different spaces, such as images of spaces 208 and 210).

The user can select a different space, such as space 210, for activation using an appropriate input. In some instances, a user can select space 210 for activation by clicking on the image representing space 210 in the row of thumbnails 203 using a cursor or finger on a touchscreen, entering a particular input on a keyboard, or using a particular gesture with the user's fingers on a multi-touch input device. The particular gesture can include a swipe of the user's fingers across the multi-touch input device, for example. The user's selection of space 210 for activation causes a deactivation of space 206 before activation of the workspace 270 associated with space 210. The transition can be illustrated using any appropriate animation. For example, as illustrated in FIG. 2B, the transition can be depicted as a sliding of workspaces across the screen. The animation can include sliding the workspace 260 being deactivated off the screen to the left as the newly activated workspace 270, including the desktop wallpaper and cluster of applications associated with selected space 210, slides onto the screen from the right. The direction of the sliding workspaces can correspond to the relative positions of the spaces in the row of thumbnails 203. In the present example, the newly activated space 210 is located to the right of the previous space 206, so the sliding motion of the workspaces 260 and 270 is from right to left.

The switch from one space to an adjacent space can be accomplished using different gestures on a multi-touch input device. In some implementations, a user can perform a swiping gesture on a multi-touch input device in a direction from right to left in order to switch a currently active space to a space represented by a thumbnail image to the right of the thumbnail representing the currently active space. Alternatively, a user can perform the swiping gesture from left to right in order to switch a currently active space to a space represented by a thumbnail image to the left of the thumbnail representing the currently active space.

Further, as seen in FIG. 2B, the newly activated space 210 is represented by a thumbnail that is adjacent to the previous space 206. Accordingly, the animation includes transitioning from one workspace 260 directly to another workspace 270. In certain implementations, a sliding animation can also be used for transitioning between two spaces that are not adjacent to each other in the row of thumbnails 203, such as transitioning directly from space 208 to space 210, for example. In this instance, some detail from the desktops of spaces between the two spaces can be included in the animation to depict the spatial relationship between spaces and from one active space to another active space. Accordingly, a transition from space 208 to space 210 in the illustrated example can include an animation showing details from space 206 sliding across the entire screen between the animations of space 208 sliding off the screen and space 210 sliding onto the screen.

Figure 2C:
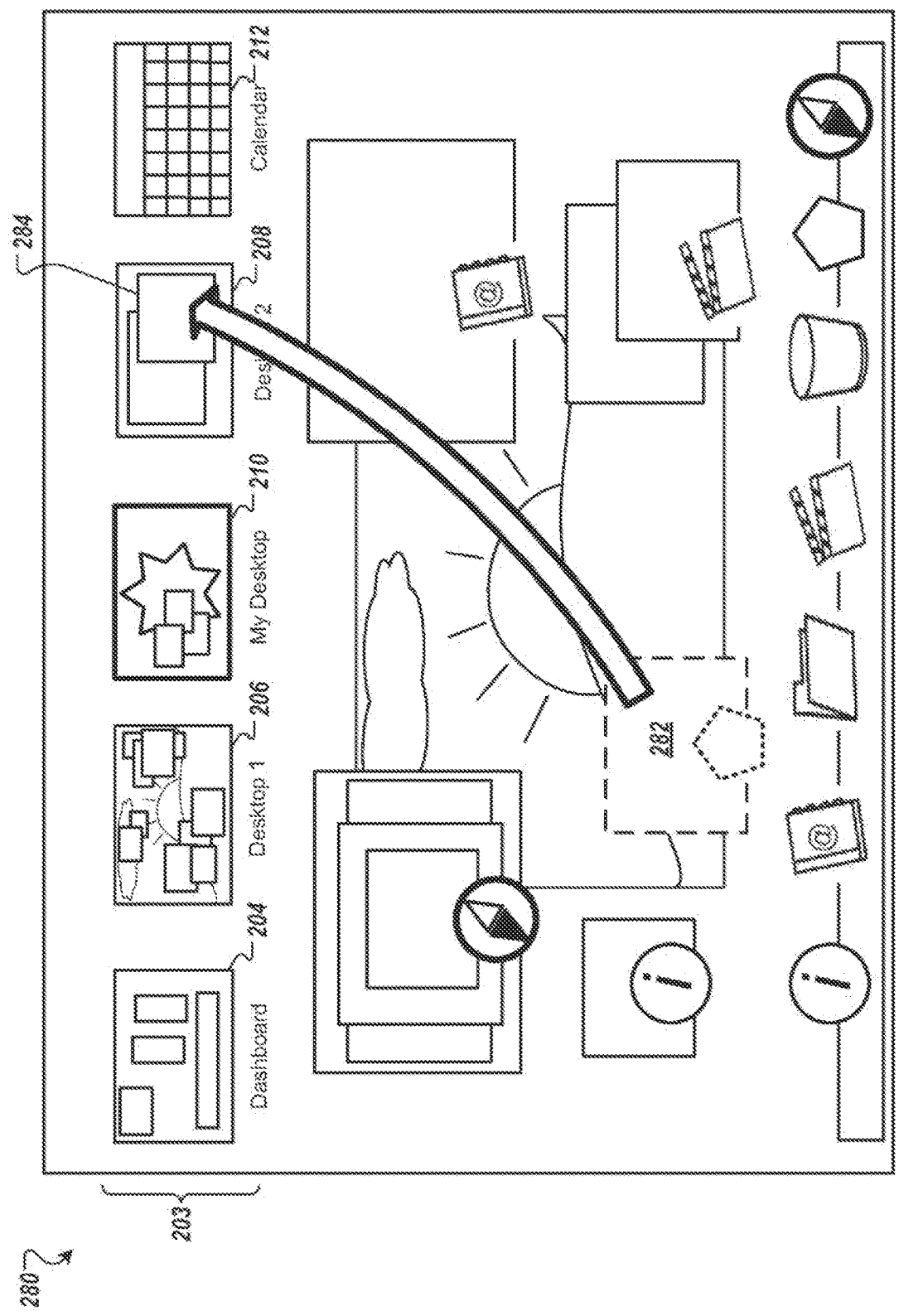
FIG. 2C illustrates an exemplary user interface showing a change in the workspace associated with an application window.

FIG. 2C depicts another example action that can be performed during management of desktop spaces. A user can create a space with an initial arrangement of application windows, icons, or desktop wallpaper. The user can then change the contents or appearance of the space using various inputs. For example, a user can move an application window or an entire cluster of windows from one space to another or associate the application window with a different space. This change can be initiated by the user, for example, because the application window is to be used in connection with the applications(s) already present in the other space. In the illustrated example, a currently active space 206 can include a particular application window 282 that a user wants to move to a different space 210. The user can select the application window 282 and, using an appropriate motion such as a drag and drop operation, transfer the application window 282 to a different space 210 by dropping the application window on the thumbnail image representing space 210. The application window 282 selected by the user can be one application window, multiple application windows from the same cluster, or an entire cluster of application windows. In some implementations, a new instance of the window is created in space 210 as window 284 while in other instances a copy of the application window is formed in space 210 while the original window 282 remains in space 206. While the above example describes a single application window being moved, other moves are also possible in some implementations. For example, it can be possible to move all windows of a type, all windows of a single application, or a selection of windows. In some implementations, some changes to spaces, such as moving content from one space to another, can be done in the bridge view or a zoom-in mode.

Figure 2D:
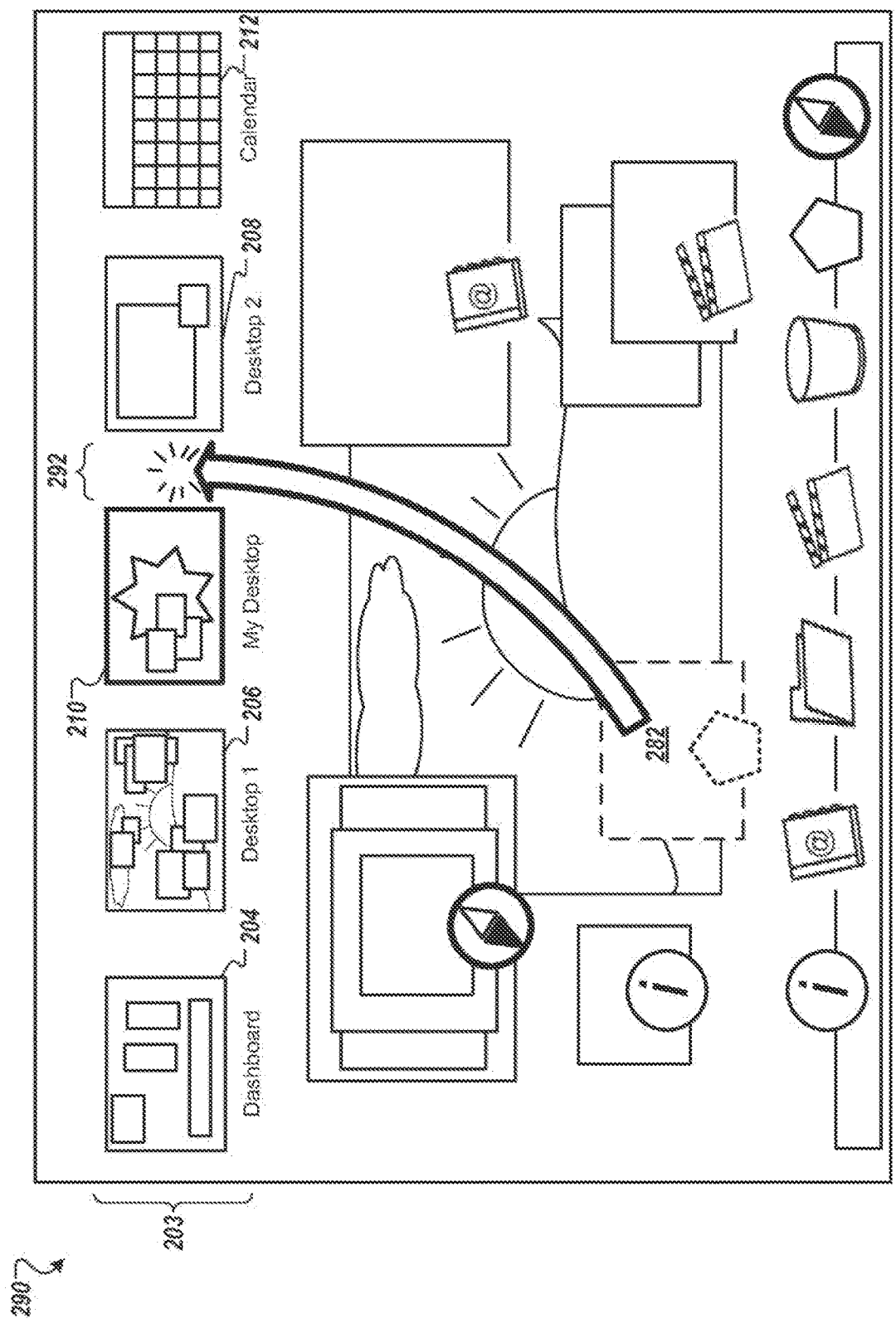
FIG. 2D illustrates an exemplary user interface showing a creation of a new workspace using an appropriate drag and drop action.

FIG. 2D depicts an example of creating a new space using an appropriate input such as a drag and drop operation. In the bridge view 290, a user can select an application window 282 and drag and drop the application window to a location 292 in between two other spaces 208 and 210. In some implementations, this operation automatically triggers creation of a new space containing application window 282, with the thumbnail image of the new space located at 292 between spaces 208 and 210.

The user can signal his or her intentions to transfer an application window using a menu, icon, popup menu, gesture, hot-key or key combinations, to name some examples. The application window to be moved can be selected, in some implementations, via mouse clicks or gestures, combinations of button presses such as tabs or arrows, or combinations thereof. Various methods of moving the application windows can be used, such as by using a mouse to drag the application window from the originating space and drop it into the destination space, or using keyboard commands to reposition the application window into the destination space.

Exemplary Actions for Managing Windows in a Cluster

FIGS. 3A-D depict example actions for managing clustered application windows in the bridge view. As described above in connection with FIG. 1, application windows sharing at least one common characteristic can be grouped together in a cluster 300 based on the common characteristic. Each cluster can include application windows from the same space that share the common characteristic. In some implementations, however, a user can link application windows from other spaces that share the same characteristic as well. In some implementations, each application window in a particular cluster represents different instances of the same application. Alternatively, each application window in a particular cluster can represent instances of different applications that share at least some common functionality. For example, application windows associated with different applications that share common functionality, such as word processing, electronic mail, web browsing, file browsing, system utility, spreadsheet manipulation, drawing, digital photo manipulation, system utility, or instant messaging, for instance, may be grouped together in a cluster, even if the application windows represent instances of different applications.

Figure 3A:
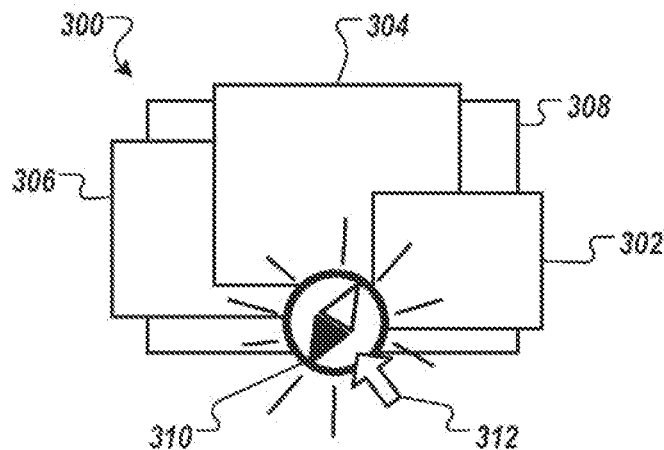
FIGS. 3A-3D illustrate exemplary actions performed on a cluster of application windows.

As illustrated in FIG. 3A, each of the application windows 302, 304, 306, and 308 can be grouped together in close proximity to each other. The application windows that are grouped together can be currently open windows in the respective spaces or windows representing recently closed windows and displaying an image of the last known appearance of the closed window. In some instances, the application windows are visually presented as a stack of overlapping windows, each of the overlapping windows having different associated z-depths, while in other instances, the application windows are in close proximity but not overlapping. The particular arrangement of application windows in a cluster can be based on various factors such as user preferences, common practices across a community of users, visibility of the different windows, or other potential factors. In FIG. 3A, the application windows 302, 304, 306, and 308 are visually presented as a stack of overlapping windows in a cluster. In some implementations, each of the application window center points can be aligned.

The application windows in FIG. 3A can also be displayed with a visual indicator 310 of the common characteristic shared among the application windows in the cluster 300. The visual indicator 310 is, in some instances, an icon 310 depicting a visual representation of the common characteristic associated with the cluster 300. For example, if the common characteristic of the application windows in the cluster 300 is that the application windows are all instances of a specific web browser application, the standard icon typically used to represent the web browser application can be used as the common characteristic indicator 310 here. If the common characteristic of the application windows is a common functionality, such as application windows associated with performing photo editing, an icon 310 of a camera, for example, can be used to denote that the application windows in the cluster are related to photo editing.

Figure 3B:
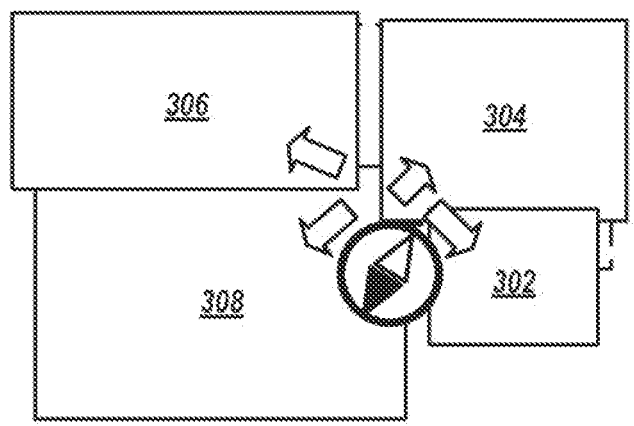

A user can perform one or more actions to expand the cluster 300 of application windows so that the application windows are more visible to the user. In certain implementations, the user can click on the indicator 310 using a pointer 312 associated with an input device to expand the application windows in the cluster 300, as depicted in FIG. 3B. After the user performs the action for expanding the cluster 300, the application windows 302, 304, 306, and 308 can be visually shifted in a radial direction away from a center point where the centers of the application windows were formerly aligned so that the user can view the contents of the application windows. Further, the dimensions of some or all of the application windows can be increased as the application windows are moved away from the cluster 300. In some instances, the application windows of a cluster 300 that has been expanded can cover up application windows in other clusters that have not been expanded. Further, application windows in other clusters can further be "de-emphasized" by being shifted toward the edges of the GUI or darkened relative to the cluster currently being expanded.

Figure 3C:
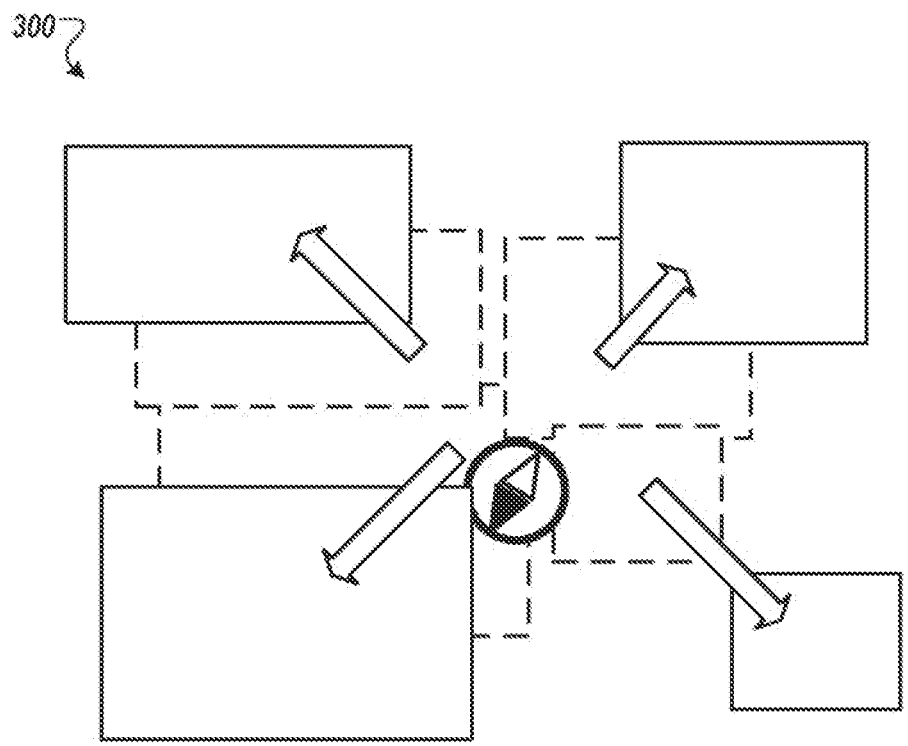
Figure 3D:
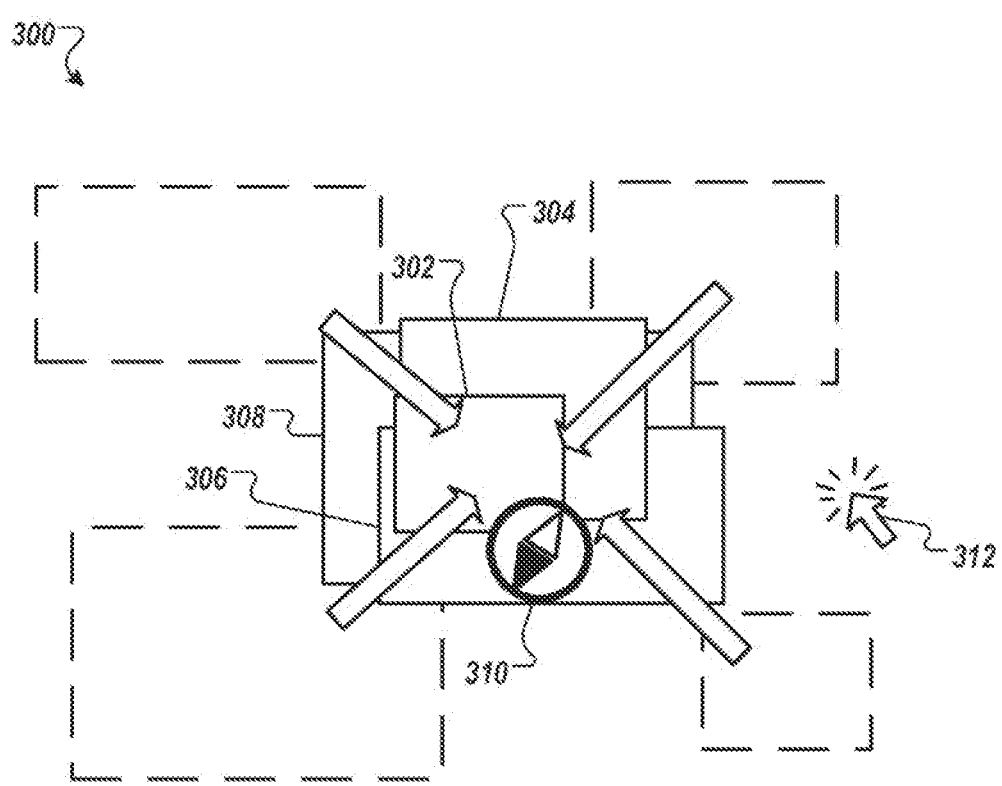

In some implementations, the application windows are expanded from the center point of the cluster 300 in a single step such that the application windows transition from their overlapping positions as seen in FIG. 3A to their respective separated positions in FIG. 3C. The application windows of a cluster can be displayed in expanded mode such that no window of the cluster overlaps with any other window of the cluster as seen in FIG. 3C. In some instances, the dimensions of the application windows can be reduced to achieve display of the application windows in such a non-overlapping manner.

The application windows can also shift away from the center of the cluster 300 in increments such that, at each increment, more of each application window is visible to the user as seen in FIG. 3B. In certain implementations, a user can enter successive iterations of input to effect a spreading apart of the application windows in the cluster 300 in increments, the application windows spreading in a radial direction gradually at each increment. In some instances, the user may not want to spread the application windows completely apart and may only want to obtain a glimpse of the contents of the application windows in a cluster as depicted in FIG. 3B. The user can enter an appropriate input, such hovering a cursor over the cluster or entering slight gestures or movements around the cluster, to effectively cause the application windows to move slightly apart from each other, giving the impression that the cluster of application windows was nudged by the user. In some implementations, a user can also identify a specific application window from a cluster of windows to be displayed in full in the GUI. For example, a user can click directly on a titlebar of the application window to separate the window from the cluster to allow the user to view the complete window.

Different types of user inputs can be used to effect the visual manipulation of application windows in a cluster 300. User inputs associated with a cursor, such as drag and drop operations, can be used to effect visual movement of the application windows. In another example, a user can also gradually spread apart the application windows by hovering a cursor associated with a mouse or touchpad, or a finger in connection with a multi-touch input device, over the clustered application windows. A user can also spread apart application windows using a scrolling motion with the user's fingers, for example. The spreading apart of the windows can be based on the speed or repetition of the user's scrolling. For example, an upward scrolling motion using the fingers can trigger the spreading apart of application windows in a cluster while a downward scrolling motion can trigger collapsing of the application windows in the cluster. Further, on a multi-touch input device or touch screen, a user can use two fingers in contact with the input device to simulate a spreading motion using the tips of the user's fingers, for example. As the user's fingers move away from each other from a central position with the fingers in close proximity to one another to an expanded position, the application windows in the cluster spread apart in proportion to the relative distance between the fingers.

FIG. 3C is a visual depiction of the action of combining application windows in a cluster or reversing the spreading of the application windows described above in connection with FIG. 3B. The contraction of the application windows 302, 304, 306, and 308 back into a cluster can occur automatically when a different cluster is selected for expansion or when a different space is activated. In certain instances, however, a user can initiate the collapse of the application windows into a compact grouping using inputs similar to those described above in connection with FIG. 3B. For example, a user can move a cursor 312 to click on the common characteristic indicator 310 or other area of the user interface to effect the collapse of the application windows. The application windows then shift inwardly toward a center point from their original positions so that portions of the application windows are now overlapping. Further, the application windows in a cluster can be collapsed automatically in response to a user's selection for expansion of application windows in a different cluster.

Exemplary Actions for Creating a New Desktop Space

Figure 4:
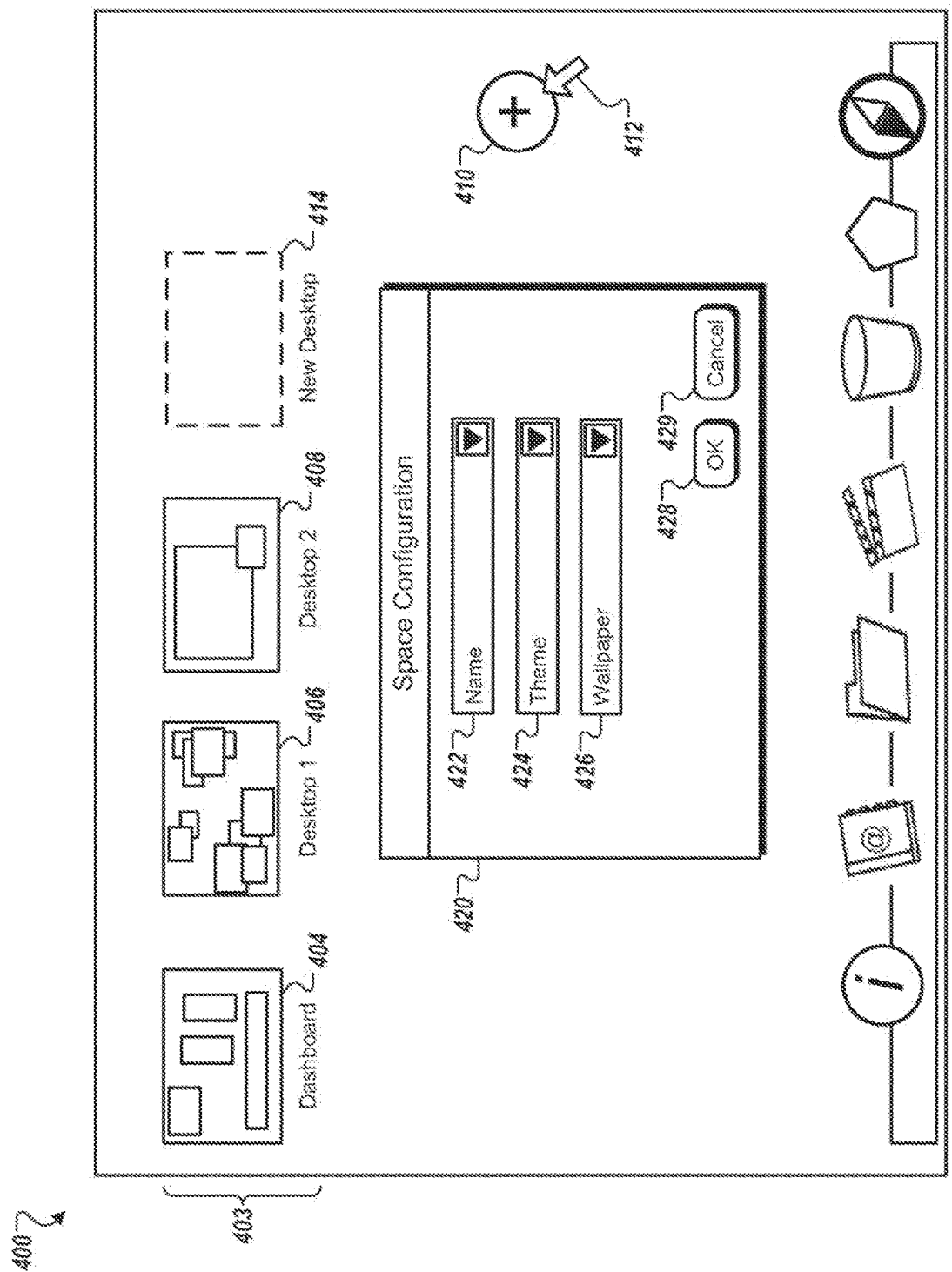
FIG. 4 illustrates an exemplary user interface showing creation of a new virtual workspace.

FIG. 4 illustrates an example configuration for creating new desktop spaces. A user can generate new spaces using an appropriate user input such as by clicking on or selecting an icon 410 displayed on the desktop or entering a particular input on a keyboard or a gesture on a multi-touch input device, for example. In some implementations, a new thumbnail image representing the new space 414 can be automatically created after the user opts for creation of the new space. Further, a configuration tool 420 can be displayed to provide options for a user to enter a name 422, theme 424, or wallpaper 426 for the new desktop space 414. A new desktop space can also be created automatically when an application is launched into full screen mode, a user selects full screen mode from within an application, or the user creates a new application window.

A new desktop space can also be configured upon creation without the configuration tool 420. For example, if a particular application window is already open in a different space, a user can access the application window and explicitly tag the window for insertion into the newly created space 414. The user can also drag and drop the application window onto the thumbnail image representing the new space 414 to include the window in the new space 414.

Figure 5:
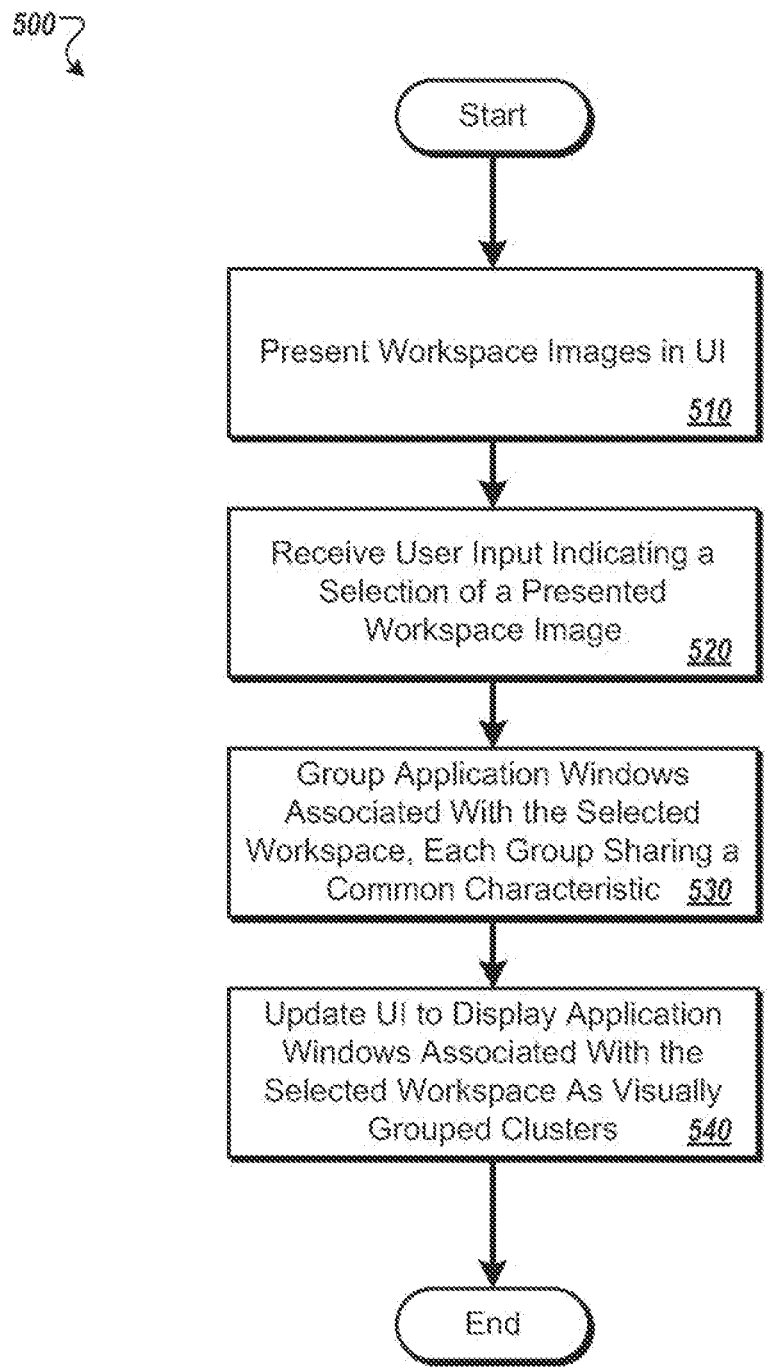
FIG. 5 is a flow diagram of an exemplary process for displaying a bridge view of workspaces in a user interface.

Exemplary Processes for Presenting a Bridge View of Desktop Spaces in a User Interface FIG. 5 is a flow diagram of an exemplary process 500 for displaying a bridge view of desktop spaces in a user interface. In the exemplary process 500, workspace images are presented in a user interface (510). The workspace images can be images corresponding to different virtual workspaces available to a user of a computer system. For example, the workspace images can be thumbnail images that depict a condensed live snapshot of the application windows, desktop configuration, and other graphical objects present in each virtual workspace. Each thumbnail image displayed in the user interface can correspond to a different virtual workspace.

The virtual workspace can be conceptualized using a "desktop" metaphor, and accordingly, the virtual workspace is a desktop space or, simply, a space. A user input is received indicating a selection of a presented workspace image (520). The user can select a particular workspace image to activate the space represented by the image. In some implementations, a plurality of workspace images are presented to the user, allowing the user to navigate the images and select a particular image to access the contents of a space associated with the image. The user input for selecting a particular space can include, for example, using a cursor to click on the workspace image associated with the particular space, a keyboard input, or predefined gestures using a multi-touch input device.

After selection of a workspace image, application windows associated with the selected workspace are grouped into clusters based on a shared common characteristic of the application windows in each cluster (530). The shared common characteristic of application windows in a cluster can be a same application associated with the windows in the cluster. In some instances, application windows that are instances of different applications but share a common functionality can be grouped together as a particular cluster.

The user interface is updated to display application windows associated with the selected workspace as visually grouped clusters (540). Each cluster of application windows can be visually depicted such that a user can efficiently differentiate application windows associated with different shared characteristic. For example, the application windows in each cluster can be visually depicted within close proximity of one another and separate from application windows of other clusters.

Figure 6:
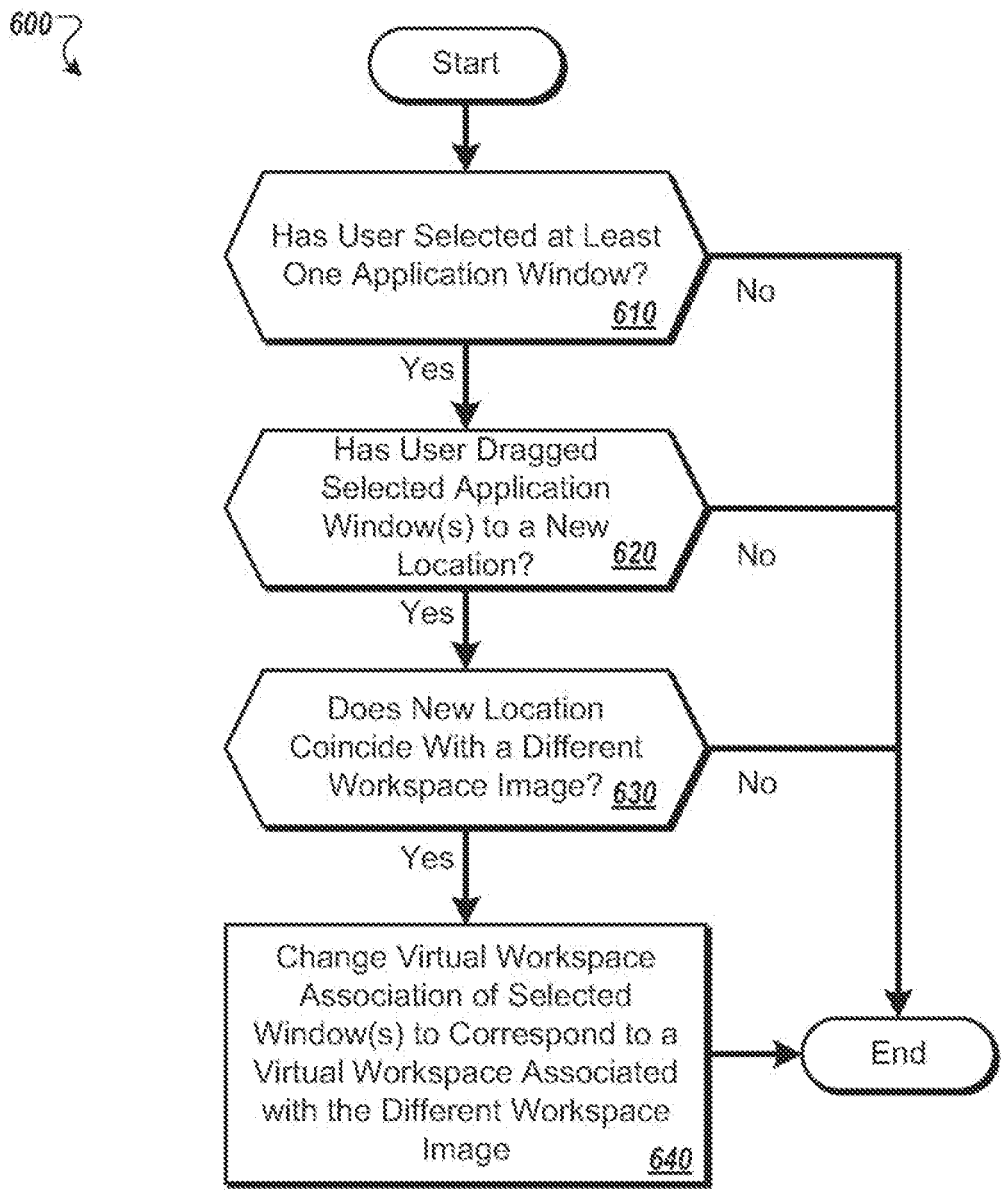
FIG. 6 is a flow diagram of an exemplary process for changing the virtual workspace associated with an application window.

FIG. 6 is a flow diagram of an exemplary process 600 for changing the virtual workspace associated with an application window. A virtual workspace associated with a workspace image can be activated and displayed to a user, the display including presentation of one or more application windows. If a user has selected at least one application window in the displayed virtual workspace (610), the user can drag the selected application window to a new location (620). If the new location coincides with a workspace image different from the workspace image associated with the displayed virtual workspace (630), the virtual workspace associated with the selected application window is changed to correspond to the virtual workspace associated with the different workspace image (640).

Figure 7:
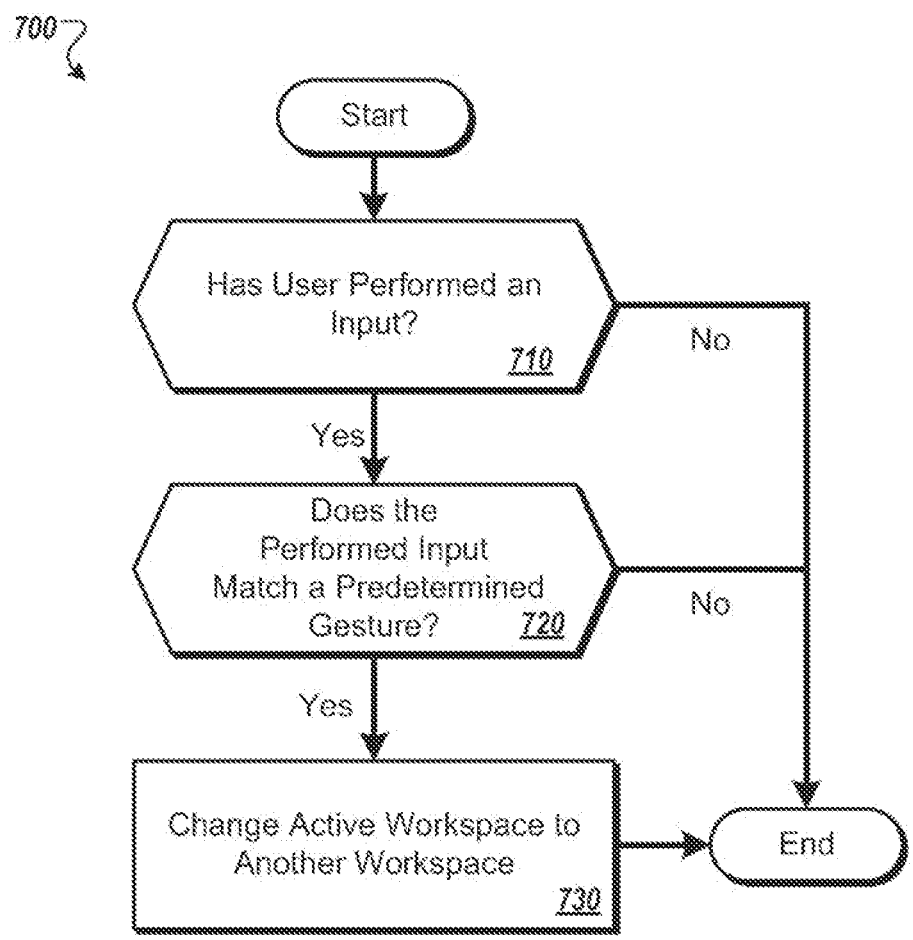
FIG. 7 is a flow diagram of an exemplary process for changing from one active workspace to a different active workspace.

FIG. 7 is a flow diagram of an exemplary process 700 for changing from one active workspace to a different workspace. An active workspace can be presented to a user in a user interface. The user can perform an input (710) that matches a predetermined gesture (720). If the user's input matches the predetermined gesture, the currently active workspace is changed to another workspace (730).

Figure 8:
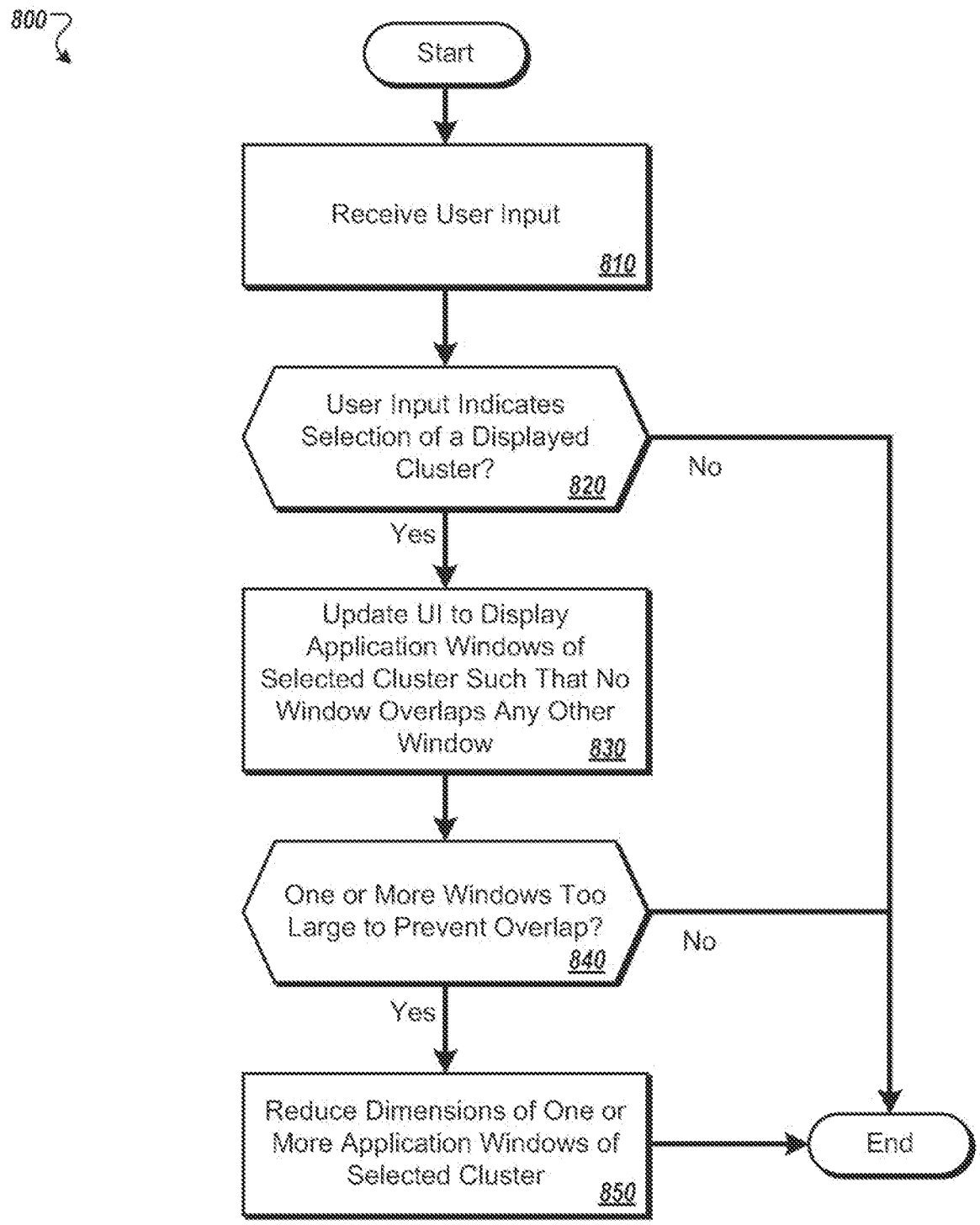
FIG. 8 is a flow diagram of an exemplary process for expanding a cluster of application windows.

FIG. 8 is a flow diagram of an exemplary process 800 for expanding a cluster of application windows. A plurality of application windows can be grouped together in a cluster based on a shared common characteristic. The cluster can be initially depicted in the user interface as a group of application windows in close proximity to each other, some of which can be overlapping. An appropriate user input is received to separate the application windows in the cluster (810). If the received user input indicates selection of a displayed cluster (820), the user interface is updated to display the application windows of the selected cluster such that no window overlaps any other window (830). If one or more application windows are too large to prevent overlap after updating of the user interface (840), the dimensions of one or more application windows of the selected cluster can be reduced so that the application windows do not overlap.

The above processes are merely examples. Various combinations of the above processes are possible.

Exemplary Software Architecture

Figure 9A:
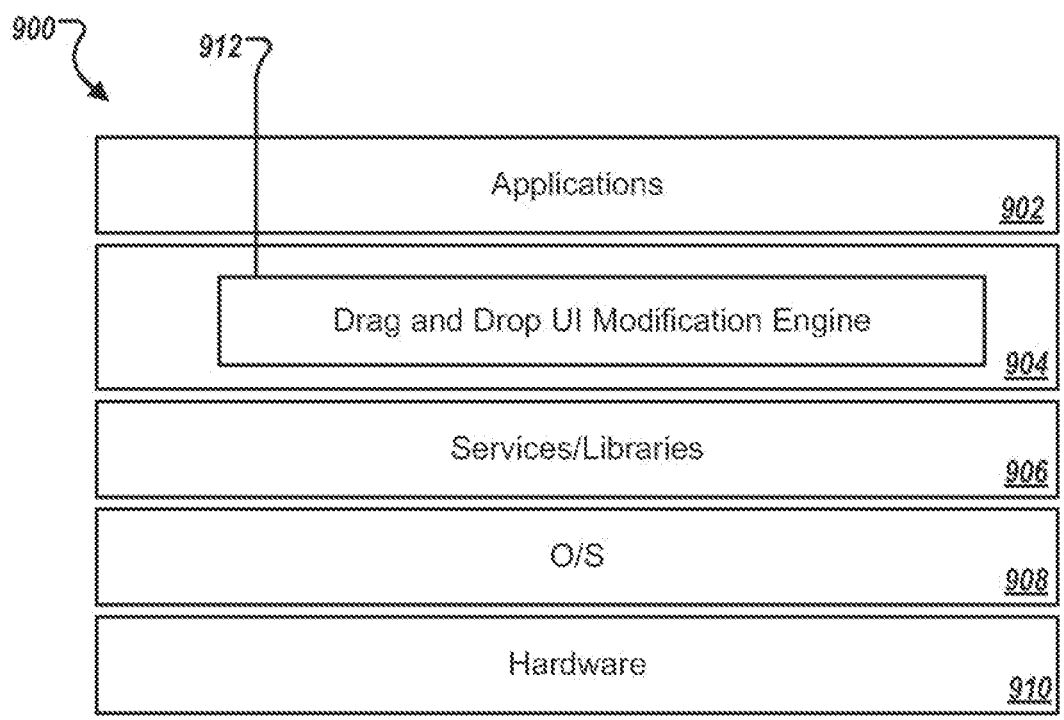
FIGS. 9A-9C illustrate exemplary software architecture for implementing the bridge interface processes described in reference to FIGS. 1-8.

FIG. 9A is an exemplary software architecture 900 for implementing the processes and user interfaces described in reference to FIGS. 1-8. In some implementations, the program modules implementing the processes can be part of a framework in a software architecture or stack. An exemplary software stack 900 can include an applications layer 902, framework layer 904, services layer 906, OS layer 908 and hardware layer 910. Applications (e.g., email, word processing, text messaging, etc.) can incorporate function hooks to an accessibility API. Framework layer 904 can include bridge view UI modification engine 912. The bridge view UI modification engine 912 can make API calls to graphics services or libraries in services layer 906 or OS layer 908 to perform all or some of its tasks described in reference to FIGS. 1-8. The bridge view UI modification engine 912 can also make API calls to the application layer 902 to obtain the information necessary to define thumbnail images of virtual workspaces, and determine the location and the content of thumbnail images of virtual workspaces according to the descriptions disclosed in this specification. The bridge view UI modification engine 912 can also make API calls to services or libraries (e.g., text services) in services layer 906 or OS layer 908 to perform all or some of its tasks.

Services layer 906 can provide various graphics, animations and UI services to support the graphical functions of the bridge view UI modification engine 912 and applications in applications layer 902. In some implementations, services layer 906 can also include a touch model for interpreting and mapping raw touch data from a touch sensitive device to touch events (e.g., gestures, rotations), which can be accessed by applications using call conventions defined in a touch model API. Services layer 906 can also include communications software stacks for wireless communications.

OS layer 908 can be a complete operating system (e.g., MAC OS) or a kernel (e.g., UNIX kernel). Hardware layer 910 includes hardware necessary to perform the tasks described in reference to FIGS. 1-8, including but not limited to: processors or processing cores (including application and communication baseband processors), dedicated signal/image processors, ASICs, graphics processors (e.g., GNUs), memory and storage devices, communication ports and devices, peripherals, etc.

One or more Application Programming Interfaces (APIs) may be used in some implementations. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

An API allows a developer of an API-calling component (which may be a third party developer) to leverage specified features provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some implementations, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other implementations, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some implementations, an API may allow a client program to use the services provided by a Software Development Kit (SDK) library. In other implementations, an application or other client program may use an API provided by an Application Framework. In these implementations, the application or client program may incorporate calls to functions or methods provided by the SDK and provided by the API, or use data types or objects defined in the SDK and provided by the API. An Application Framework may, in these implementations, provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embodiment, call APIs from different providers such as a set of APIs from an OS provider and another set of APIs from a plug-in provider and another set of APIs from another provider (e.g. the provider of a software library) or creator of the another set of APIs.

Figure 9B:
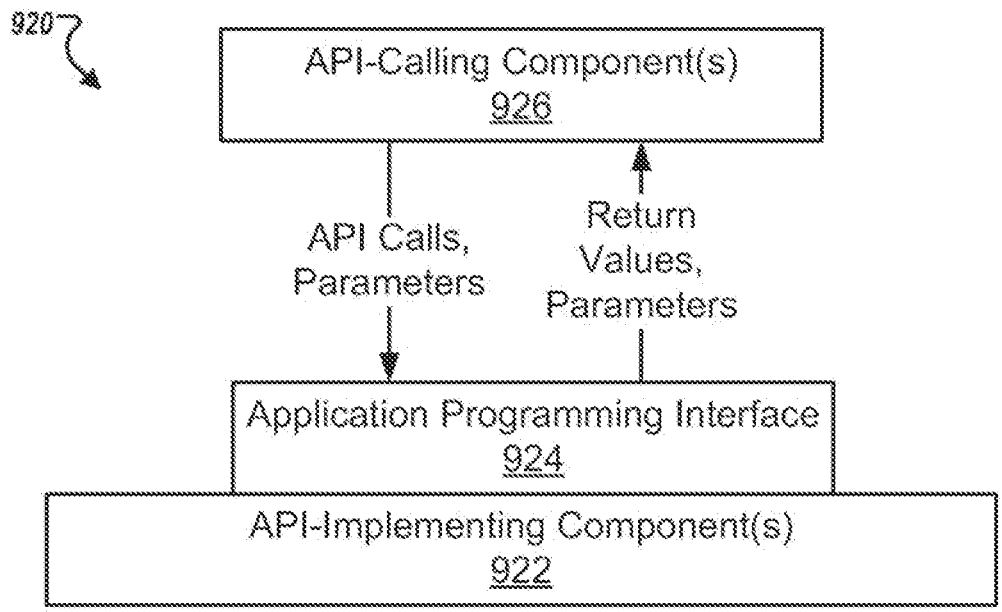

FIG. 9B is a block diagram 920 illustrating an exemplary API architecture, which may be used in the implementation of some the processes and user interface changes disclosed herein. As shown in FIG. 9B, the API architecture 920 includes the API-implementing component 922 (e.g., an operating system, a library, a device driver, an API, an application program, software or other module) that implements the API 924. The API 924 specifies one or more functions, methods, classes, objects, protocols, data structures, formats and/or other features of the API-implementing component that may be used by the API-calling component 926. The API 924 can specify at least one calling convention that specifies how a function in the API-implementing component receives parameters from the API-calling component and how the function returns a result to the API-calling component. The API-calling component 926 (e.g., an operating system, a library, a device driver, an API, an application program, software or other module), makes API calls through the API 924 to access and use the features of the API-implementing component 922 that are specified by the API 924. The API-implementing component 922 may return a value through the API 924 to the API-calling component 926 in response to an API call.

It will be appreciated that the API-implementing component 922 may include additional functions, methods, classes, data structures, and/or other features that are not specified through the API 924 and are not available to the API-calling component 926. It should be understood that the API-calling component 926 may be on the same system as the API-implementing component 922 or may be located remotely and accesses the API-implementing component 922 using the API 924 over a network. While FIG. 9B illustrates a single API-calling component 930 interacting with the API 924, it should be understood that other API-calling components, which may be written in different languages (or the same language) than the API-calling component 926, may use the API 924.

The API-implementing component 922, the API 924, and the API-calling component 926 may be stored in a machine-readable medium, which includes any mechanism for storing information in a form readable by a machine (e.g., a computer or other data processing system). For example, a machine-readable medium includes magnetic disks, optical disks, random access memory; read only memory, flash memory devices, etc.

Figure 9C:
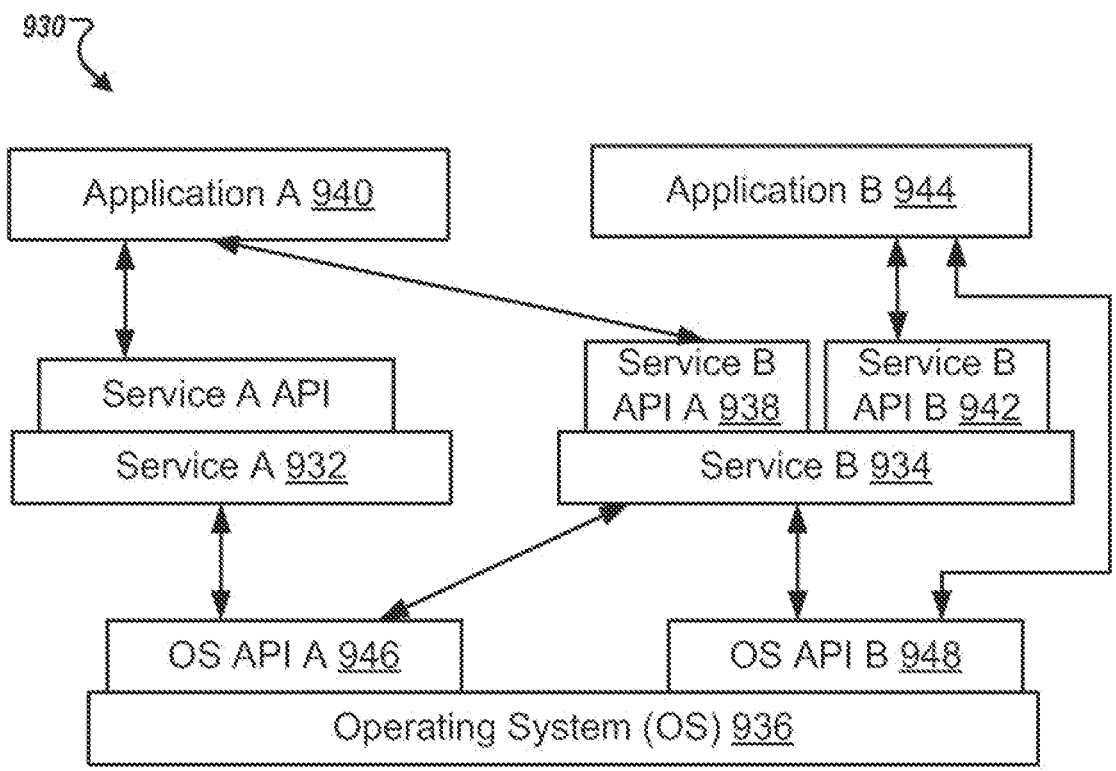

In FIG. 9C ("Software Stack" 930), an exemplary implementation 930, applications can make calls to Service A 932 or Service B 934 using several Service APIs (Service API A and Service API B) and to Operating System (OS) 936 using several OS APIs. Service A 932 and service B 934 can make calls to OS 936 using several OS APIs.

Note that the Service B 934 has two APIs, one of which (Service B API A 938) receives calls from and returns values to Application A 940 and the other (Service B API B 942) receives calls from and returns values to Application B 944. Service A 932 (which can be, for example, a software library) makes calls to and receives returned values from OS API A 946, and Service B 934 (which can be, for example, a software library) makes calls to and receives returned values from both OS API A 946 and OS API B 948. Application B 944 makes calls to and receives returned values from OS API B 948.

Exemplary Device Architecture

Figure 10:
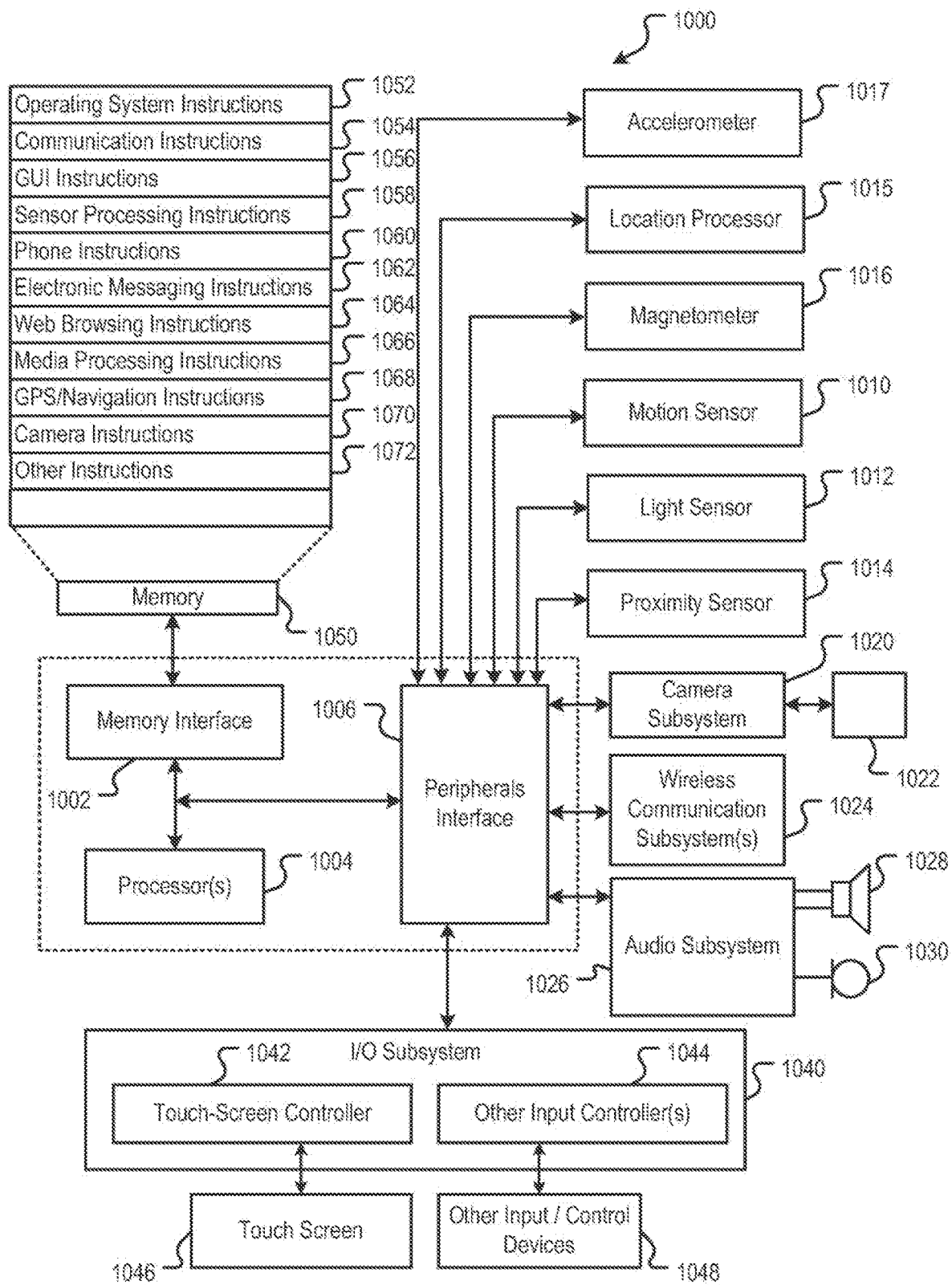
FIG. 10 is a block diagram of exemplary hardware architecture for implementing the user interfaces and processes described in reference to FIGS. 1-9C.

FIG. 10 is a block diagram of exemplary hardware architecture 1000 for a device implementing the bridge view of virtual workspaces processes and interfaces described in reference to FIGS. 1-9. The device can include memory interface 1002, one or more data processors, image processors and/or processors 1004, and peripherals interface 1006. Memory interface 1002, one or more processors 1004 and/or peripherals interface 1006 can be separate components or can be integrated in one or more integrated circuits. The various components in the device, for example, can be coupled by one or more communication buses or signal lines.

Sensors, devices, and subsystems can be coupled to peripherals interface 1006 to facilitate multiple functionalities. For example, motion sensor 1010, light sensor 1012, and proximity sensor 1014 can be coupled to peripherals interface 1006 to facilitate orientation, lighting, and proximity functions of the mobile device. Location processor 1015 (e.g., GPS receiver) can be connected to peripherals interface 1006 to provide geopositioning. Electronic magnetometer 1016 (e.g., an integrated circuit chip) can also be connected to peripherals interface 1006 to provide data that can be used to determine the direction of magnetic North. Thus, electronic magnetometer 1016 can be used as an electronic compass. Accelerometer 1017 can also be connected to peripherals interface 1006 to provide data that can be used to determine change of speed and direction of movement of the mobile device.

Camera subsystem 1020 and an optical sensor 1022, e.g., a charged coupled device (CCD) or a complementary metal-oxide semiconductor (CMOS) optical sensor, can be utilized to facilitate camera functions, such as recording photographs and video clips.

Communication functions can be facilitated through one or more wireless communication subsystems 1024, which can include radio frequency receivers and transmitters and/or optical (e.g., infrared) receivers and transmitters. The specific design and implementation of the communication subsystem 1024 can depend on the communication network(s) over which a mobile device is intended to operate. For example, a mobile device can include communication subsystems 1024 designed to operate over a GSM network, a GPRS network, an EDGE network, a Wi-Fi or WiMax network, and a Bluetooth network. In particular, the wireless communication subsystems 1024 can include hosting protocols such that the mobile device can be configured as a base station for other wireless devices.

Audio subsystem 1026 can be coupled to a speaker 1028 and a microphone 1030 to facilitate voice-enabled functions, such as voice recognition, voice replication, digital recording, and telephony functions.

I/O subsystem 1040 can include touch screen controller 1042 and/or other input controller(s) 1044. Touch-screen controller 1042 can be coupled to a touch screen 1046 or pad. Touch screen 1046 and touch screen controller 1042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 1046.

Other input controller(s) 1044 can be coupled to other input/control devices 1048, such as one or more buttons, rocker switches, thumb-wheel, infrared port, USB port, and/or a pointer device such as a stylus. The one or more buttons (not shown) can include an up/down button for volume control of speaker 1028 and/or microphone 1030.

In one implementation, a pressing of the button for a first duration may disengage a lock of the touch screen 1046; and a pressing of the button for a second duration that is longer than the first duration may turn power to the device on or off. The user may be able to customize a functionality of one or more of the buttons. The touch screen 1046 can, for example, also be used to implement virtual or soft buttons and/or a keyboard.

In some implementations, the device can present recorded audio and/or video files, such as MP3, AAC, and MPEG files. In some implementations, the device can include the functionality of an MP3 player, such as an iPod™. The device may, therefore, include a pin connector that is compatible with the iPod. Other input/output and control devices can also be used.

Memory interface 1002 can be coupled to memory 1050. Memory 1050 can include high-speed random access memory and/or non-volatile memory, such as one or more magnetic disk storage devices, one or more optical storage devices, and/or flash memory (e.g., NAND, NOR). Memory 1050 can store operating system 1052, such as Darwin, RTXC, LINUX, UNIX, OS X, WINDOWS, or an embedded operating system such as VxWorks. Operating system 1052 may include instructions for handling basic system services and for performing hardware dependent tasks. In some implementations, operating system 1052 can include a kernel (e.g., UNIX kernel).

Memory 1050 may also store communication instructions 1054 to facilitate communicating with one or more additional devices, one or more computers and/or one or more servers. Memory 1050 may include graphical user interface instructions 1056 to facilitate graphic user interface processing; sensor processing instructions 1058 to facilitate sensor-related processing and functions; phone instructions 1060 to facilitate phone-related processes and functions; electronic messaging instructions 1062 to facilitate electronic-messaging related processes and functions; web browsing instructions 1064 to facilitate web browsing-related processes and functions; media processing instructions 1066 to facilitate media processing-related processes and functions; GPS/Navigation instructions 1068 to facilitate GPS and navigation-related processes and instructions; and camera instructions 1070 to facilitate camera-related processes and functions. The memory 1050 may also store other software instructions (not shown), such as security instructions, web video instructions to facilitate web video-related processes and functions, and/or web-shopping instructions to facilitate web shopping-related processes and functions. In some implementations, the media processing instructions 1066 are divided into audio processing instructions and video processing instructions to facilitate audio processing-related processes and functions and video processing-related processes and functions, respectively. An activation record and International Mobile Equipment Identity (IMEI) or similar hardware identifier can also be stored in memory 1050. Memory 1050 can also include other instructions 1072.

Each of the above identified instructions and applications can correspond to a set of instructions for performing one or more functions described above. These instructions need not be implemented as separate software programs, procedures, or modules. Memory 1050 can include additional instructions or fewer instructions. Furthermore, various functions of the mobile device may be implemented in hardware and/or in software, including in one or more signal processing and/or application specific integrated circuits.

The features described can be implemented in digital electronic circuitry, or in computer hardware, firmware, software, or in combinations of them. The features can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard, a mouse or a trackball, or a pointing device (e.g., a finger or stylus on a touch-sensitive surface or touch-sensitive display) by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps as disclosed herein can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   at a computer system with a display and one or more input devices:
      displaying, on the display, a user interface for managing virtual workspaces, wherein displaying the user interface includes concurrently displaying:
         representations of one or more virtual workspaces, including a representation of a first virtual workspace, displayed in a first region of the user interface for managing virtual workspaces; and representations of a plurality of application windows associated with the first virtual workspace including a representation of a first application window, wherein the representations of the plurality of application windows associated with the first virtual workspace are displayed in a second region of the user interface for managing virtual workspaces different from the first region;

while displaying the user interface for managing virtual workspaces, detecting a user input, via the one or more input devices, directed to the representation of the first application window, the user input indicating a movement of the representation of the first application window of the representations of the plurality of application windows from the second region to a location in the first region that does not include a representation of a virtual workspace; and in response to detecting the user input, creating a second virtual workspace and displaying a representation of the second virtual workspace in the first region that includes the representation of the first application window, wherein the second virtual workspace is a new virtual workspace.

2. The method of claim 1, wherein the user input comprises dragging the representation of the first application window from the second region to the location in the first region that does not include a representation of a virtual workspace.

3. The method of claim 1, wherein the user input comprises a touch input, a mouse input, or a keyboard input.

4. The method of claim 1, further comprising:
in response to detecting the user input, disassociating the first application window from the first virtual workspace.

5. The method of claim 1, further comprising:
in response to detecting the user input, ceasing displaying the representation of the first application window in the second region.

6. The method of claim 1, further comprising:
in response to detecting the user input, ceasing displaying the representation of the first application window in the representation of the first virtual workspace in the first region.

7. The method of claim 1, further comprising:
in response to detecting the user input, maintaining an association of the first application window with the first virtual workspace.

8. The method of claim 1, wherein:
the one or more virtual workspaces further includes a third virtual workspace;
displaying the representations of the one or more virtual workspaces displayed in the first region includes displaying the representation of the first virtual workspace and the representation of the third virtual workspace adjacent to the first virtual workspace;
the location in the first region that does not include a representation of a virtual workspace is a space between the representation of the first virtual workspace and the representation of the third virtual workspace; and
the representation of the second virtual workspace is displayed between the representation of the first virtual workspace and the representation of the third virtual workspace in the first region.

9. The method of claim 1, further comprising:
while displaying the user interface for managing virtual workspaces, detecting a second user input, via the one or more input devices, indicating a movement of the representation of the first application window of the representations of the plurality of application windows from the second region to a location in the first region inside one of the representations of the one or more virtual workspaces corresponding to a respective virtual workspace of the one or more virtual workspaces different from the first virtual workspace; and in response to detecting the second user input, adding the first application window to the respective virtual workspace and displaying the representation of the first application window in a representation of the respective virtual workspace.

10. A computer system comprising:
a display;
one or more input devices; and
one or more processors configured to:
display, on the display, a user interface for managing virtual workspaces, wherein displaying the user interface includes concurrently displaying:
representations of one or more virtual workspaces, including a representation of a first virtual workspace, displayed in a first region of the user interface for managing virtual workspaces; and
representations of a plurality of application windows associated with the first virtual workspace including a representation of a first application window, wherein the representations of the plurality of application windows associated with the first virtual workspace are displayed in a second region of the user interface for managing virtual workspaces different from the first region;
while displaying the user interface for managing virtual workspaces, detect a user input, via the one or more input devices, directed to the representation of the first application window, the user input indicating a movement of the representation of the first application window of the representations of the plurality of application windows from the second region to a location in the first region that does not include a representation of a virtual workspace; and
in response to detecting the user input, create a second virtual workspace and display a representation of the second virtual workspace in the first region that includes the representation of the first application window, wherein the second virtual workspace is a new virtual workspace.

11. The computer system of claim 10, wherein the user input comprises dragging the representation of the first application window from the second region to the location in the first region that does not include a representation of a virtual workspace.

12. The computer system of claim 10, wherein the user input comprises a touch input, a mouse input, or a keyboard input.

13. The computer system of claim 10, the one or more processors further configured to:
in response to detecting the user input, disassociate the first application window from the first virtual workspace.

14. The computer system of claim 10, the one or more processors further configured to:
in response to detecting the user input, cease displaying the representation of the first application window in the second region.

15. The computer system of claim 10, the one or more processors further configured to:
in response to detecting the user input, cease displaying the representation of the first application window in the representation of the first virtual workspace in the first region.

16. The computer system of claim 10, the one or more processors further configured to:
in response to detecting the user input, maintain an association of the first application window with the first virtual workspace.

17. The computer system of claim 10, wherein:
the one or more virtual workspaces further includes a third virtual workspace;
displaying the representations of the one or more virtual workspaces displayed in the first region includes displaying the representation of the first virtual workspace and the representation of the third virtual workspace adjacent to the first virtual workspace;
the location in the first region that does not include a representation of a virtual workspace is a space between the representation of the first virtual workspace and the representation of the third virtual workspace; and
the representation of the second virtual workspace is displayed between the representation of the first virtual workspace and the representation of the third virtual workspace in the first region.

18. The computer system of claim 10, the one or more processors further configured to:
while displaying the user interface for managing virtual workspaces, detect a second user input, via the one or more input devices, indicating a movement of the representation of the first application window of the representations of the plurality of application windows from the second region to a location in the first region inside one of the representations of the one or more virtual workspaces corresponding to a respective virtual workspace of the one or more virtual workspaces different from the first virtual workspace; and
in response to detecting the second user input, add the first application window to the respective virtual workspace and displaying the representation of the first application window in a representation of the respective virtual workspace.

19. A non-transitory computer-readable storage medium storing instructions that, when executed by a computer system with a display and one or more input devices, cause the computer system to:
display, on the display, a user interface for managing virtual workspaces, wherein displaying the user interface includes concurrently displaying:
representations of one or more virtual workspaces, including a representation of a first virtual workspace, displayed in a first region of the user interface for managing virtual workspaces; and
representations of a plurality of application windows associated with the first virtual workspace including a representation of a first application window, wherein the representations of the plurality of application windows associated with the first virtual workspace are displayed in a second region of the user interface for managing virtual workspaces different from the first region;
while displaying the user interface for managing virtual workspaces, detect a user input, via the one or more input devices, directed to the representation of the first application window, the user input indicating a movement of the representation of the first application window of the representations of the plurality of application windows from the second region to a location in the first region that does not include a representation of a virtual workspace; and
in response to detecting the user input, create a second virtual workspace and display a representation of the second virtual workspace in the first region that includes the representation of the first application window, wherein the second virtual workspace is a new virtual workspace.

20. The non-transitory computer-readable storage medium of claim 19, wherein the user input comprises dragging the representation of the first application window from the second region to the location in the first region that does not include a representation of a virtual workspace.

21. The non-transitory computer-readable storage medium of claim 19, wherein the user input comprises a touch input, a mouse input, or a keyboard input.

22. The non-transitory computer-readable storage medium of claim 19, wherein the instructions, when executed, cause the computer system to:
in response to detecting the user input, disassociate the first application window from the first virtual workspace.

23. The non-transitory computer-readable storage medium of claim 19, wherein the instructions, when executed, cause the computer system to:
in response to detecting the user input, cease displaying the representation of the first application window in the second region.

24. The non-transitory computer-readable storage medium of claim 19, wherein the instructions, when executed, cause the computer system to:
in response to detecting the user input, cease displaying the representation of the first application window in the representation of the first virtual workspace in the first region.

25. The non-transitory computer-readable storage medium of claim 19, wherein the instructions, when executed, cause the computer system to:
in response to detecting the user input, maintain an association of the first application window with the first virtual workspace.

26. The non-transitory computer-readable storage medium of claim 19, wherein:
the one or more virtual workspaces further includes a third virtual workspace;
displaying the representations of the one or more virtual workspaces displayed in the first region includes displaying the representation of the first virtual workspace and the representation of the third virtual workspace adjacent to the first virtual workspace;
the location in the first region that does not include a representation of a virtual workspace is a space between the representation of the first virtual workspace and the representation of the third virtual workspace; and
the representation of the second virtual workspace is displayed between the representation of the first virtual workspace and the representation of the third virtual workspace in the first region.

27. The non-transitory computer-readable storage medium of claim 19, wherein the instructions, when executed, cause the computer system to:

while displaying the user interface for managing virtual workspaces, detect a second user input, via the one or more input devices, indicating a movement of the representation of the first application window of the representations of the plurality of application windows from the second region to a location in the first region inside one of the representations of the one or more virtual workspaces corresponding to a respective virtual workspace of the one or more virtual workspaces different from the first virtual workspace; and in response to detecting the second user input, add the first application window to the respective virtual workspace and displaying the representation of the first application window in a representation of the respective virtual workspace.

* * * * *